United States Patent
Guevokian et al.

(10) Patent No.: US 7,334,011 B2
(45) Date of Patent: Feb. 19, 2008

(54) METHOD AND SYSTEM FOR PERFORMING A MULTIPLICATION OPERATION AND A DEVICE

(75) Inventors: David Guevokian, Tampere (FI); Aki Launiainen, Tampere (FI); Petri Liuha, Tampere (FI)

(73) Assignee: Nokia Corporation, Espoo (FI)

( * ) Notice: Subject to any disclaimer, the term of this patent is extended or adjusted under 35 U.S.C. 154(b) by 714 days.

(21) Appl. No.: 10/703,154

(22) Filed: Nov. 6, 2003

(65) Prior Publication Data

US 2004/0133618 A1 Jul. 8, 2004

(30) Foreign Application Priority Data

Nov. 6, 2002 (FI) ................... 20021982

(51) Int. Cl.
*G06F 7/523* (2006.01)
(52) U.S. Cl. .................................. 708/631
(58) Field of Classification Search ............. 708/631
See application file for complete search history.

(56) References Cited

U.S. PATENT DOCUMENTS

| | | | |
|---|---|---|---|
| 4,965,762 A | 10/1990 | Williams | |
| 5,025,408 A | 6/1991 | Sherman | |
| 5,150,322 A | 9/1992 | Smith et al. | |
| 5,636,155 A | 6/1997 | Kabuo | |
| 5,646,877 A | 7/1997 | Mahant-Shetti et al. | |
| 5,761,106 A * | 6/1998 | Crocker | 708/631 |
| 5,875,125 A | 2/1999 | Hwang et al. | |
| 5,889,692 A * | 3/1999 | Wolrich et al. | 708/631 |
| 6,052,706 A * | 4/2000 | Wheeler et al. | 708/631 |
| 6,173,304 B1 | 1/2001 | Goldovsky et al. | |
| 6,240,438 B1 | 5/2001 | Goto | |
| 6,353,843 B1 * | 3/2002 | Chehrazi et al. | 708/631 |

FOREIGN PATENT DOCUMENTS

WO  WO 03/052584 A2  6/2003

OTHER PUBLICATIONS

"High-Radix Design of a Scalable Modular Multiplier" by A. Tenca et al, Cryptographic Hardware and Embedded Systems-CHES 2001 (C.K. Koc et al, eds.), Lecture Notes in Computer Science, to appear, Springer-Verlag, Berlin, Germany, May 13-16, 2001.
"A Booth Multiplier Accepting Both a Redundant or a non redundant input with no additional delay" by M. Daumas et al, IEEE International Conference on Application-specific Systems, Architectures and Processors (E.E. Swarzlander, et al, eds.), (Boston, MA), pp. 205-214, 2000.
"An architecture for a high speed partial parallel multiplier optimized for long integer modular arithmetic" by J. Grosschadl, N. Kero et al (Eds.): Austrochip 1998, Wiener Neustadt/AT, Oct. 1 1998, pp. 55-60.

* cited by examiner

*Primary Examiner*—D. H. Malzahn

(57) ABSTRACT

In a method for performing a multiplication operation between a first operand and a second operand the multiplication operation is divided into at least two suboperations. At least one of the suboperations is performed in a time-interlaced manner, wherein the at least one suboperation is further divided into partial suboperations so that each partial suboperation is initiated at a different time.

26 Claims, 11 Drawing Sheets

METHOD AND SYSTEM FOR PERFORMING A MULTIPLICATION OPERATION AND A DEVICE

CROSS-REFERENCE TO RELATED APPLICATION

Figure 1:
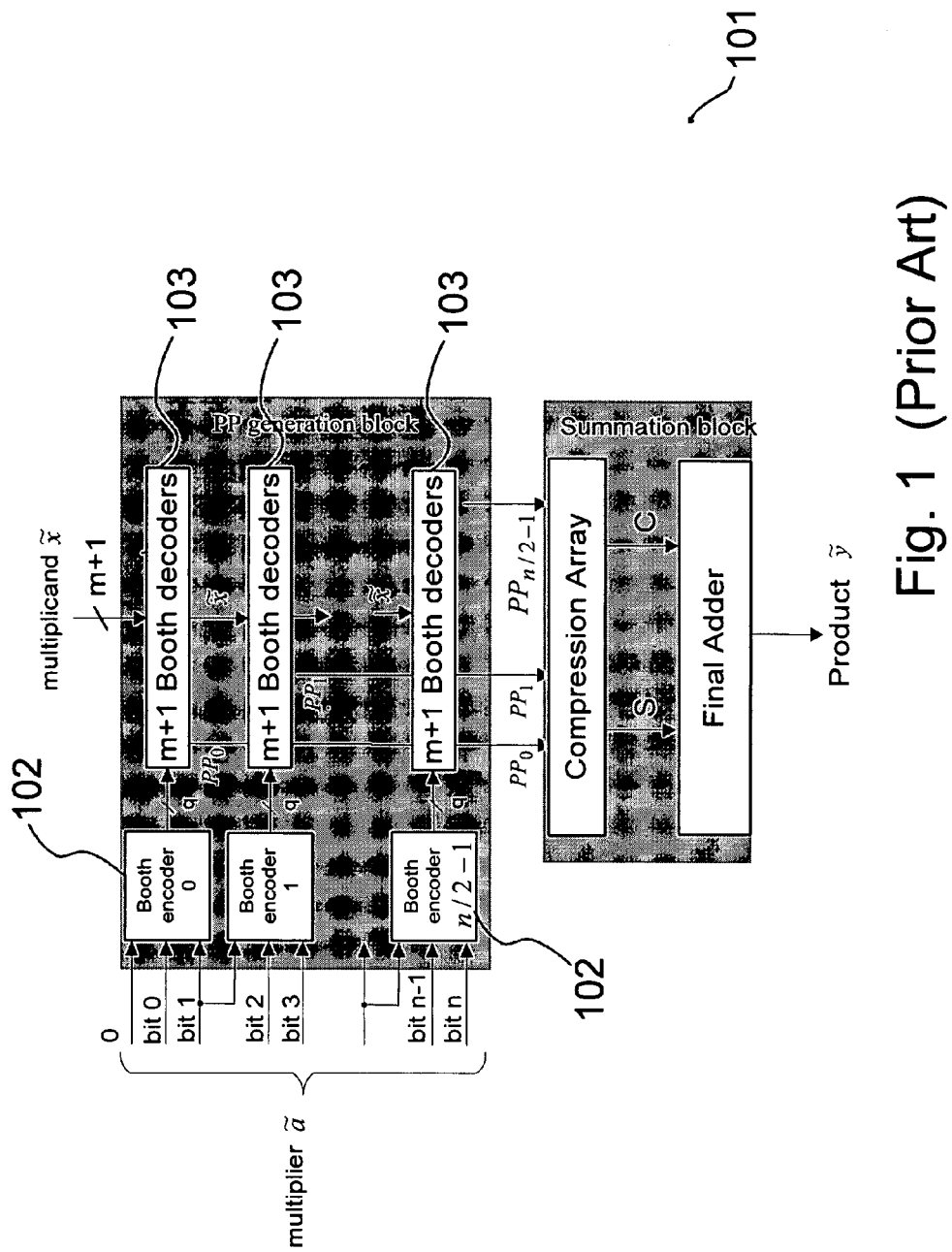

Priority is claimed under 35 U.S.C. § 119 from Finnish application FI 20021982 filed Nov. 6, 2002.

1. Technical Field

The present invention relates to a method for performing one multiplication operation and another multiplication operation in a pipelined manner, in which the other multiplication operation is started before the one multiplication operation is finished, the multiplication operations are divided into at least a first and a second suboperation, and each of the first and second suboperation is carried out in one pipeline stage. The invention also relates to a device such as a wireless terminal and to a system for performing the method.

2. Discussion of Related Art

There are many applications in which multiplication and/or multiply-accumulate (MAC) operations are needed. As a non-restrictive example many signal processing applications, such as digital signal filtering applications, video/image processing applications etc., are applications in which real time multiplication operations are implemented. Also other applications in which vector and/or matrix operations are needed use multiplication and/or MAC operations. Multiplication operations are normally implemented as summation and bit-wise shifting operations. Such multiplication operations are resource demanding tasks because one multiplication operation between two operands needs many summation and shifting operations to calculate the multiplication result.

Specific to video/image processing algorithms is the vast amount of computations that have to be implemented in real time. Therefore, the high-speed performance has been the driving force in developing parallel specialized structures (accelerators) for different video/image processing algorithms or subtasks. A prior art video/image processing system involves several such accelerators (e.g. Sum of Absolute Differences (SAD), cosine transform, etc.) each being composed of large amount of hardware elements. However, with developing mobile communication systems, the hardware area, which especially affects the costs of the system, and the power/energy consumption are as important properties as the high-speed performance. One way towards satisfying all these criteria is further modernization of Digital Signal Processors (DSPs) and reduction of the number of specialized accelerators. Although some improvements exist on this area the developed systems still do not always meet the high-speed and power consumption requirements.

The prior art architectures for video and image processing and other signal processing tasks are usually based on conventional multiplier structures. Many multiplication methods and a very large variety of devices for implementing multiplication and/or multiply-accumulate operations have been developed. In the following, only multiplication methods and general multiplier structures for the case where both the operands (the multiplicand and the multiplier) are unknown, multiplication of two fixed-point signed integers presented in two's complement arithmetic, and the so called radix-T methods will be considered.

The two's complement representation of the n-bit (including the sign) multiplier a will be denoted as $\tilde{a}=a_{n-1}a_{n-2}\ldots a_1a_0$, and the two's complement representation of the m-bit (including the sign) multiplicand x will be denoted as $\tilde{x}=x_{m-1}x_{m-2}\ldots x_1x_0$, respectively. The relation between a and $\tilde{a}$ (and a similar relation between x and $\tilde{x}$) is as follows:

$$a = -a_{n-1}2^{n-1} + \sum_{r=0}^{n-2} a_r 2^r, \quad x = -x_{m-1}2^{m-1} + \sum_{l=0}^{m-2} x_l 2^l. \quad (1)$$

In a radix-T parallel multiplication method the two's complement $\tilde{y}=y_{m+n-1}y_{m+n-2}\ldots y_1y_0$ of the product $y=a\cdot x$ is obtained according to the formula $$\tilde{y} = \sum_{r=0}^{n_{radix-T}-1} (A_r x) 2^{rt_{radix-T}} \quad (2)$$

in the following two main steps:

Step 1. Generation of partial products (PP) $A_r \cdot x$, $r=0, \ldots, n_{radix-T}-1$ such that Equation (2) is valid.

Step 2. Summing up in parallel all the partial products preliminary shifting the rth partial product $A_r \cdot x$, $r=0, \ldots, n_{radix-T}-1$ for $rt_{radix-T}$ positions to the left.

A radix-T MAC unit operates in a similar way with the difference that another number (accumulating term) is added along with partial products at the Step 2.

The Step 1 will now be considered in more detail. Depending on how the numbers $A_r \cdot x$, $r=0, \ldots, n_{radix-T}-1$ are defined and obtained, different multiplication methods can be derived. In turn, the choice of the numbers $A_r \cdot x$, $r=0, \ldots, n_{radix-T}-1$ is, in fact, dictated by representation of the multiplier a. The simplest multiplication method is a radix-2 method, which uses the basic two's complement representation of a given in the left equation of (1). In this case, the two's complement of the product will be obtained as:

$$\tilde{y} = \sum_{r=0}^{n_{radix-2}-1} (A_r x) 2^{rt_{radix-2}} = \sum_{r=0}^{n-2} (a_r x) 2^r - (a_{n-1} x) 2^{n-1}, \quad (3)$$

that is, $n_{radix-2}=n$, and the partial products $A_r \cdot x$, $r=0, \ldots, n-1$ are defined by $A_r=a_r$ for $r=0, \ldots, n-2$, and $A_{n-1}=-a_{n-1}$ for $r=n-1$. These partial products may simply be (and are usually) formed using an array of 2-input AND gates between every two's complement bit of the multiplier $\tilde{a}$ and the multiplicand $\tilde{x}$. The value of $A_r \cdot x$, $r=0, \ldots, n-1$ is multiplied to $2^r$ (i.e. is shifted to the left for r positions) before being accumulated at the second step. It should be noted that in this method the partial product $A_{n-1} \cdot x$, which sometimes is also called a correction factor, is treated differently from the other partial products.

The non-uniform nature of the partial products is avoided in another radix-2 multiplication method based on Booth recoding of the two's complement bits $\tilde{a}$ of the multiplier into redundant signed digit numbers. The product can now be presented as:

$$\tilde{y} = \sum_{r=0}^{n_{radix-2}-1} (A_r x) 2^r = \sum_{r=0}^{n-1} (-a_r + a_{r-1}) x 2^r, \quad a_{-1} = 0 \quad (4)$$

That is, $n_{radix-2}=n$, as before but the partial products $A_r \cdot x$, $r=0, \ldots, n-1$ are all now defined by $A_r=-a_r+a_{r-1}$. Similarly to the previous method, the value of $A_r \cdot x$, $r=0, \ldots, n-1$, is multiplied to $2^r$ before being added at the second step. In this scheme the partial products are selected among $0, \pm x$. The two of these values (0 and x) are readily available while finding $-x$ requires inverting the bits of $\tilde{x}$ and adding unity. Normally, addition of unity is performed in the Step 2 where the partial products are summed.

There are totally $n_{radix-2}=n$ partial products to be summed in a radix-2 multiplication method irrespective of if the Booth recoded or non-recoded method is used. In order to reduce the number of partial products and, hence, the delay of the second stage (summing up partial products), the radix-4 Modified Booth Algorithm (MBA) based method has been developed. The MBA is, perhaps, the most popular multiplication method and is being extensively studied and optimized. In MBA, the two's complement of the product is obtained as the sum $$\tilde{y} = \sum_{r=0}^{n_{radix-4}-1} (A_r x) 2^{2r} \qquad (5)$$

$$= \sum_{r=0}^{n/2-1} ([-2a_{2r+1} + a_{2r} + a_{2r-1}]x) 2^{2r}, \; a_{-1}=0$$

of $n_{radix-4}=n/2$ partial products, where the value of $A_r \in \{-2,-1,0,1,2\}$, $r=0, 1, \ldots, n/2-1$, is chosen according to three consecutive bits $a_{2r+1}, a_{2r}, a_{2r-1}$ ($a_{-1}=0$) of the two's complement representation of the multiplier $\tilde{a}$. The partial product $A_r x$, $r=0, 1, \ldots, n/2-1$, is multiplied by $2^{2r}$ (i.e. hardware shifted to the left for $2r$ positions) before being added at the Step 2.

In order to simplify formulae below, in every case where a term like n/k occurs, it is assumed that n is an integer multiple of k. This is a valid assumption since a two's complement number may be complemented with an arbitrary number of bits (repeating the most significant bit).

FIG. 1 presents the Modified Booth Algorithm 101 in general. There are n/2 Booth encoding-decoding rows, each row consisting of a Booth encoder 102, and m+1 Booth decoders 103, which may be grouped by two. Every Booth encoder 102 analyzes three consecutive bits of the two's complement of the multiplier $\tilde{a}$, with an overlap of one bit, and outputs q signals to the corresponding row of decoders 103. In some recent prior art designs the value of q=3. According to these q signals the decoder rows form the partial products $(A_r x) \in \{0, \pm x, \pm 2x\}$ having the bits $\tilde{x}$ of the multiplicand at their inputs. The nonnegative multiples of x are readily available since 2x is formed by a hardwired shift. The negative multiples of x are formed by inverting the bits of the corresponding positive multiples of x and then adding 1 which is usually performed at the Step 2. For example, U.S. Pat. No. 6,173,304 describes such a system implementing the Booth encoders and decoders. In the radix-2 method the partial products can be found easier than in the Modified Booth Algorithm but the number of the partial products is reduced to n/2 when the Modified Booth Algorithm is used which leads to significant advantages in speed performance, area, and power consumption.

In order to further reduce the number of partial products, the Booth encoding has further been extended to multibit (arbitrary radix-T) recoding. The general equation for the product is now given as:

$$\tilde{y} = \sum_{r=0}^{n_{radix-T}-1} (A_r x) 2^{rt} \qquad (6)$$

$$= \sum_{r=0}^{n/t-1} \left( \left[ -a_{tr+t-1} 2^{t-1} + \sum_{i=0}^{t-2} a_{tr+i} 2^i + a_{tr-1} \right] x \right) 2^{tr}$$

$$a_{-1}=0, \; T=2^t=2^{t_{radix-T}}.$$

That is, there are $n_{radix-T}=n/t$ partial products ($T=2^t$) and every partial product is selected according to t+1 consecutive bits of the multiplier $\tilde{a}$ from the list of potential candidates Ax with A ranging between $-2^{t-1}$ and $2^{t-1}$. Every potential partial product may be relatively easily formed by addition of two (for T=8, 16) or more (for T>16) power-of-2 multiples of x, and, possibly, inversion of the bits followed by addition of 1 (at Step 2). For example, in the case of radix-8 recoding, the list of potential partial products is $0, \pm x, \pm 2x, \pm 3x, \pm 4x$. All the nonnegative multiples from this list are readily available except for 3x which may be obtained in one addition: 3x=x+2x. Negative multiples may be found by invert-add-1 method, as before. In the case of radix-16 recoding, the list of potential partial products is $0, \pm x, \pm 2x, \pm 3x, \ldots, +8x$ all of which become available by implementing three independent additions/subtractions in order to obtain 3x=x+2x, 5x=x+4x, 7x=-x+8x. The potential partial product 6x can be formed by shifting 3x one position to the left. For the cases of higher radices, however, there are some potential partial products (e.g. 11x or 13x) that cannot be obtained in one addition/subtraction.

Figure 2:
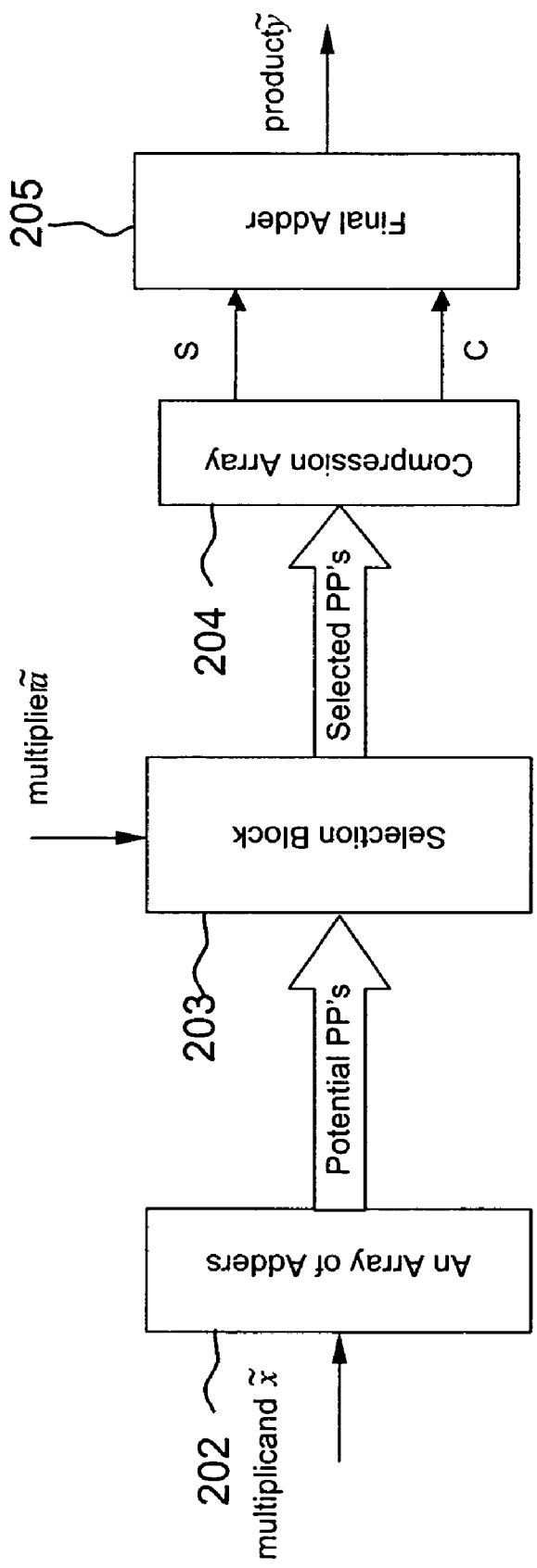

FIG. 2 presents the general structure 201 of prior art radix-T ($T \geq 8$) multibit Booth recoded ("radix-higher-than-four") multipliers. This structure consists of an Array of Adders 202 for computing the list of potential partial products $0, \pm x, \pm 2x, \ldots, \pm Tx$, a Selection Block 203 for selecting n/t partial products according to the multiplier bits, and a Summation Block 204 for summing up the selected partial products. The final adder 205 forms the product $\tilde{y}$ from sum S and carry C terms produced by the summation block 204.

The Array of Adders of a typical prior art radix-higher-than-four multiplier consists of as many adders as there are odd positive multiples of x involved in the list of potential partial products (one in the case T=8, three in the case T=16, etc.). Usually, fast carry-look-ahead (CLA) adders are used since forming the list of potential partial products is rather time consuming part of such multipliers. In a patent U.S. Pat. No. 5,875,125 a special x+2×adder has been proposed which may be used in radix-8 multipliers. It should be noted that mixed radix-4/8 multipliers have also been proposed, for example in U.S. Pat. No. 4,965,762, which, however, are mainly useful for iterative (not parallel) multipliers where the potential partial products are generated and accumulated serially. U.S. Pat. No. 5,646,877 describes a multiplier structure where the partial products for an arbitrary radix are obtained as sums or differences of shifted versions of 3x and of x within the Array of Adders consisting of an x+2x adder for generating 3x, two shifters and an adder/subtracter.

The Selection Block 203 of a typical prior art radix-higher-than-four multiplier consists of n/t radix-T Booth encoders and equal number of decoder rows. Each encoder analyzes the corresponding (t+1)-tuple of the multiplier and outputs a plurality of control signals according to which the corresponding partial products are formed by the decoder rows. Remarks on how to extend the radix-4 Booth encoders and decoders to higher radices are given, for example, in a patent U.S. Pat. No. 6,240,438.

In the following, the summing up of the partial products, i.e. the Step 2, will be considered in more detail. Most of the parallel multiplier/MAC unit structures use summation blocks composed of a compression array followed by a fast adder (final adder) for summing up the partial products formed at Step 1 (see FIGS. 1 and 2). The compression array reduces the $n_{radix-T}$ partial product rows to two rows corresponding to sum S and carry C terms that are added with the final adder. The compression array is usually composed of either full and half adders (a carry-save-adder-tree or a Wallace tree) or 4:2 compressors. The final adder is usually a fast carry-look-ahead adder, which is carefully designed according to the delays of different bits from the compression array.

Figure 3A:
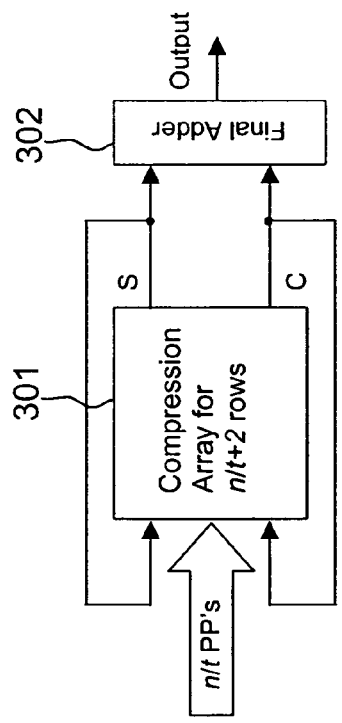
Figure 3B:
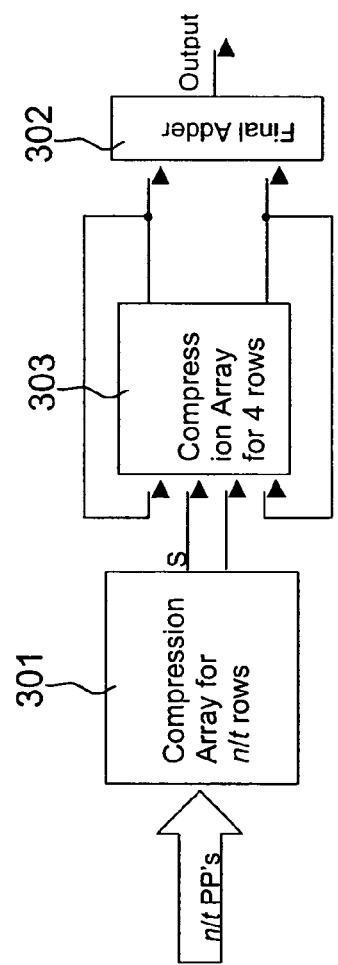

There are principally two ways of extending multiplier structures to MAC units as depicted in FIGS. 3a and 3b. In the first case (FIG. 3a), the two outputs (the S and C terms) of the compression array 301 are fed back to its inputs so that the current partial product values are accumulated with the two addends of the current accumulation value. The final S and C terms are then added within the final adder 302. In the second case (FIG. 3b) these outputs are fed to another compression array 303 outputs of which are fed back to its (the second compression array 303) input. Now, the S and the C terms of the current product are accumulated to the current accumulation value until the last cycle when the final S and C terms are added within the final adder 302. The depth (and, therefore, the overall delay) of the whole compression array may be smaller in the first case while the width and, therefore, the area and power consumption may be smaller in the second case. As a summary of high-radix multipliers, it should be noted that the higher the radix the higher the complexity of the Step 1 (generating partial products) but lower the complexity of the Step 2 (summing up partial products). The "radix-higher-than-four" multiplication methods have not gained popularity, perhaps due to the necessity of having rather time and area consuming partial product generators, including both the Array of Adders and the Selection Block. Commonly, the radix-4 MBA is considered the best prior art parallel multiplication method and is used in many of industrial multipliers.

DISCLOSURE OF INVENTION

The major aim of the invention to be presented is to enhance some multiplier/MAC unit features, which are desired from a video and image processing point of view but are absent or weak in prior art solutions. First, the most popular radix-4 Booth recoded multiplier/MAC method will be considered. As a general drawback of this method it is more power consuming than higher radix methods. Another general drawback is that, even though the number of partial products is reduced to half compared to radix-2 multiplication, it still could be reduced using higher radices. That is, the complexity of this method is mainly concentrated in the Step 2 (summing up partial products). When pipelining a radix-4 Booth-recoded multiplier/MAC structure, usually the partial product generation block is considered as the first pipeline stage which, however, is purely balanced with (i.e. faster than) the other pipeline stages.

Considering the "radix-higher-than-four" multipliers, it has been shown that different realizations of these multipliers, when considered for implementation of only the multiplication operation, perform competitively to the radix-4 multipliers with respect to area and time criteria while outperforming those with respect to power consumption. The main drawback of "radix-higher-than-four" methods is the necessity of having an array of adders at the partial product generation block.

The Booth recoded multipliers also have a drawback related to the necessity of handling the negative multiples of the multiplicand as well as the sign extensions. More importantly, "radix-higher-than-sixteen" Booth recoded multipliers need more than one-level addition to generate potential partial products.

Therefore, one of the aims of the invention is to develop high-radix multipliers with no Booth recoding.

If a parallel array of independent prior art or newly proposed high-radix multipliers/MAC units would be employed to implement a plurality of corresponding operations, a large silicon area would be required even though the faster blocks could be shared without affecting overall throughput.

Therefore, another aim of the invention is to develop bank of multipliers and/or MAC units that will have some common blocks.

An essential drawback of the pipelined prior-art multipliers and/or MAC units is that the pipeline stages are poorly balanced.

This is illustrated in two tables. Table 1a presents various characteristics of different blocks used in prior art Booth recoded radix-T multipliers/MAC units for multiplying an n-bit multiplier and an m-bit multiplicand, and Table 1b presents various characteristics of different blocks used in new Non-recoded radix-T multipliers/MAC units for multiplying an n-bit multiplier and an m-bit multiplicand, respectively. Table 1c presents the acronyms utilized in Tables 1a and 1b. Analyzing Tables 1a and 1b, one can see that there are essential differences in the delays of different blocks of every multiplier in every multiplier/MAC unit type for most of the values of n and m. That is, a direct pipelined realization of these multipliers would suffer from poor balancing between pipeline stages. Trying to achieve better balancing between these pipeline stages, one could flexibly increase the throughputs of the first and the last pipeline stages by designing carry-look-ahead (CLA) adders with different numbers of FAs within one carry-ripple block. This is why the delays of these blocks are not indicated in Tables 1a and 1b. In some cases, e.g. small n, higher radix T, this may mean very small carry-ripple blocks, and therefore large area. Anyhow, using CLAs may be a solution for speeding up these two stages, though this solution is not the most efficient. The situation is different for the middle two pipeline stages (the SB and the CA) since the state-of-the-art circuits for these blocks are designed by optimizing critical paths in such a way that internal pipelining of these circuits would not be reasonable. Moreover, relative differences between the delays of these blocks are very different for every type (BR (T=8, 16), NR1 (T=4, 8)) of prior art multiplier/MAC unit structures for different values of n. For the cases of smaller n and higher radix T (e.g., T=16 and arbitrary n) the Selection Block is slower than the Compression Array while in other cases the situation is opposite. This means that designing faster circuits for one or another block will not give a general solution to the problem of balancing these stages. All of these make it difficult to derive a systematic method for pipelining prior art multiplier/MAC structures with well-balanced pipeline stages.

TABLE 1a

| Multiplier Type | | BR, T = 4 | BR, T = 8 | BR, T = 16 |
|---|---|---|---|---|
| AA width, s | | — | 1 | 3 |
| # of potential PPs | | 5 | 9 | 17 |
| Components of the SB | Encod. | n/2 BR4 | n/3 BR8 | n/4 BR16 |
| | Decod. | n/2 (m + 1) – BD4 | n/3 (m + 2) – 4:1 t/c | n/14 (m + 3) – 8:1 t/c |
| | SE | Yes | Yes | Yes |
| Delay of the SB | | 6t | 12t | 16t |
| # of inputs to CA | | n/2 (m + 1) – bit + 3n/2 1-bit | n/3 (m + 2) – bit + 4n/3 1-bit | n/4 (m + 3) – bit + 5n/4 1-bit |
| # of inputs/ levels/delay of the FA-CA | n = 13, x | 7/4/8t | 5/3/6t | 4/2/4t |
| | MAC | 9/5/10t | 8/4/8t | 6/3/6t |
| | n = 16, x | 8/4/8t | 6/3/6t | 4/2/4t |
| | MAC | 10/5/10t | 8/4/8t | 6/3/6t |
| | n = 64, x | 32/8/16t | 22/7/14t | 16/6/12t |
| | MAC | 34/9/18t | 24/7/14t | 18/6/12t |
| # of inputs/ levels/delay of the 4:2-CA | n = 13, x | 7/2/6t | 5/(4:2) + FA/5t | 4/1/3t |
| | MAC | 9/2(4:2) + FA/8t | 7/2/6t | 6/2/6t |
| | n = 16, x | 8/2/6t | 6/2/6t | 4/1/3t |
| | MAC | 10/3/9t | 8/2/6t | 6/2/6t |
| | n = 64, x | 32/4/12t | 22/4/12t | 16/3/9t |
| | MAC | 34/5/15t | 24/4/12t | 18/4/12t |

TABLE 1b

| Multiplier Type | NR1, T = 4 | NR1, T = 8 | NR2, T = 4 | NR2, T = 8 |
|---|---|---|---|---|
| AA width, s | 2 | 4 | 1 | 3 |
| # of potential PPs | 4 | 8 | 4 | 8 |
| Components of the SB | | | | |
| Encod. | No | No | 1 BR4 | 1 BR8 |
| Decod. | n/2 (m + 1) – 4:1 | n/3 (m + 2) – 8:1 | (m + 1) – (BD4 + n/2(4:1)) | (m + 2)(4:1 t/c + n/3(8:1)) |
| SE | No | No | No | No |
| Delay of the SB | 5t | 6t | 6t | 12t |
| # of inputs to CA | ((n – 1)/2 + 1) (m + 2)-bit | ((n – 1)/3 + 1) (m + 3)-bit | (n – 1)/2 (m + 4)-bit + 1 1-bit | (n – 1)/3 (m + 6)-bit + 1 1-bit |
| # of inputs/ levels/delay of the FA-CA | | | | |
| n = 13, x | 7/4/8t | 5/3/6t | 6/3/6t | 4/2/4t |
| MAC | 9/4/8t | 7/4/8t | 8/4/8t | 6/3/6t |
| n = 16, x | 9/4/8t | 6/3/6t | 8/4/8t | 5/3/6t |
| MAC | 11/5/10t | 8/4/8t | 10/5/10t | 7/4/8t |
| n = 64, x | 33/8/16t | 22/7/14t | 32/8/16t | 21/7/14t |
| MAC | 35/9/18t | 24/7/14t | 34/9/18t | 23/8/16t |
| # of inputs/ levels/delay of the 4:2-CA | | | | |
| n = 13, x | 7/2/6t | 5/(4:2) + FA/5t | 6/2/6t | 4/1/3t |
| MAC | 9/2(4:2) + FA/8t | 7/2/6t | 8/2/6t | 6/2/6t |
| n = 16, x | 9/2(4:2) + FA/8t | 6/2/6t | 8/2/6t | 5/(4:2) + FA/5t |
| MAC | 11/3/9t | 8/2/6t | 10/3/9t | 7/2/6t |
| n = 64, x | 33/4(4:2) + FA/14t | 22/4/12t | 32/4/12t | 21/4/12t |
| MAC | 35/5/15t | 24/4/12t | 34/5/15t | 23/4/12t |

TABLE 1c

| | |
|---|---|
| BR | Booth recoded radix-T multiplier |
| NR1 | Non-recoded radix-T multiplier of type 1 |
| NR2 | Non-recoded radix-T multiplier of type 2 |
| SE | Sign extension circuitry |
| BR4, BR8, BR16 | Booth recoder circuitries for the corresponding radix |
| BD4 | Radix-4 Booth decoder circuitry |
| 4:1, 8:1, 4:1 t/c, 8:1 t/c | Multiplexers or true/complement multiplexers with corresponding number of inputs. |
| SB | Selection Block |
| CA, FA-CA, 4:2 CA | Compression array, CA composed of Full (FA) and Half Adders (HA), CA composed of 4::2 compressors |

An aim of the present invention is to implement an improved calculation structure and method for fixed point multiplication operations in parallel-pipelined manner wherein the pipeline stages are better balanced.

The invention is based on the idea that parallel multipliers or MAC units are used to perform calculation operations at least partly in time interlaced manner. In short, the structure of the present invention is derived from radix-T Booth-recoded (T=8, 16) multiplier/MAC unit prior art structures or from new non-recoded ones (with radix T=4, 8) by making use of pipelining wherein every pipeline stage is parallelized at a different level of parallelism so that more parallelism is used for relatively slower blocks. This way, a large degree of flexibility is introduced into designing multiplier/MAC units. In one aspect, this allows to achieve higher throughput compared to a single prior art multiplier/MAC, with a minimum increase in hardware/power cost. In another aspect, this leads to significant savings in the area, better balancing between pipeline stages, and therefore better hardware utilization and power consumption compared to having a bank of independent prior art multipliers/MAC units. Another important advantage of the method according to the invention is that more parallelism without increasing input/output bus width is achieved.

The high-radix multiplier/MAC units structures involve blocks that may be independently used to perform other useful operations. Such blocks are the array of adder/subtractors or the summation block. An aim of the invention is to design reconfigurable high-radix multiplier/MAC unit structures that may be configured to involve only a subset of multiplier blocks so that implementation of the suboperations of the multiplication operation will also be supported by the same device.

To be exact, the method according to the present invention is primarily characterized in that at least one of suboperations involved in a high-radix multiplication is performed in parallel in one pipeline stage, where a suboperation for the second multiplication operation is started before the corresponding suboperation for the first multiplication operation is finished. The device according to the present invention is primarily characterized in that the device further includes means for performing at least one of suboperations involved in a high-radix multiplication in parallel in one pipeline stage, and means for starting a suboperation for said another multiplication operation before the corresponding suboperation for said one multiplication operation is finished. The wireless terminal according to the present invention is primarily characterized in that the wireless terminal further includes means for performing at least one of suboperations involved in a high-radix multiplication in parallel in one pipeline stage, and means for starting a suboperation for said another multiplication operation before the corresponding suboperation for said one multiplication operation is finished. The computing device according to the present invention is primarily characterized in that the computing device further includes means for performing at least one of suboperations involved in a high-radix multiplication in parallel in one pipeline stage, and means for starting a suboperation for said another multiplication operation before the corresponding suboperation for said one multiplication operation is finished. The system according to the present invention is primarily characterized in that the device further includes means for performing at least one of suboperations involved in a high-radix multiplication in parallel in one pipeline stage, and means for starting a suboperation for said another multiplication operation before the corresponding suboperation for said one multiplication operation is finished.

The present invention shows significant advantages compared to solutions of prior art. By using a method according to the invention, multiplication operations in the context of video/image processing can be performed faster and with less power than with prior art methods and devices. The invention is especially efficient for implementing a plurality of multiplications/MACs. Significant reduction in the area and power consumption can be achieved due to better balancing between pipeline stages as compared to e.g. the case of having an array of independent multipliers. High speed performance (high throughput) is due to utilization of pipelining with a flexible possibility of balancing the delays of different pipeline stages (multiplier blocks) and reducing the period of the total structure to the delay of the fastest block. Increasing of the throughput is achieved with a minimal increase in the area and without increasing the input/output bus width as compared to a single pipelined prior art (radix-4 or higher) multiplier.

BRIEF DISCUSSION OF THE DRAWINGS

Figure 4:
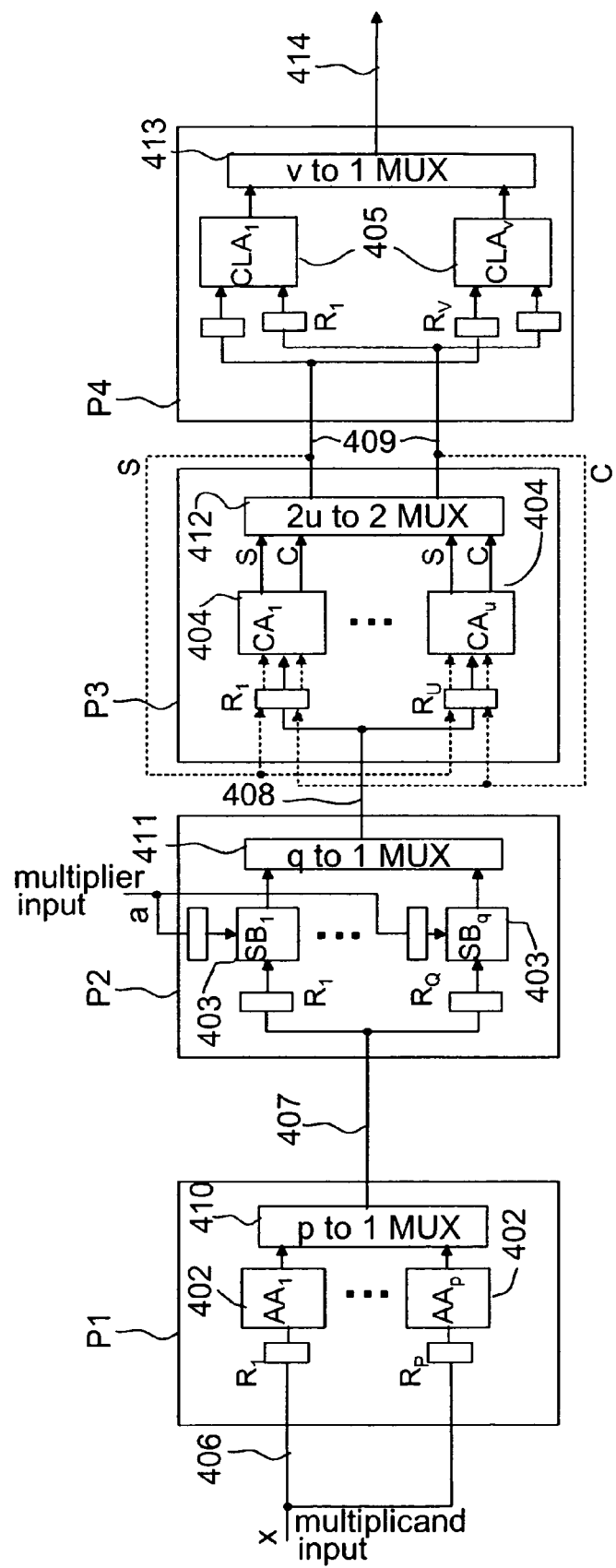
Figure 5B:
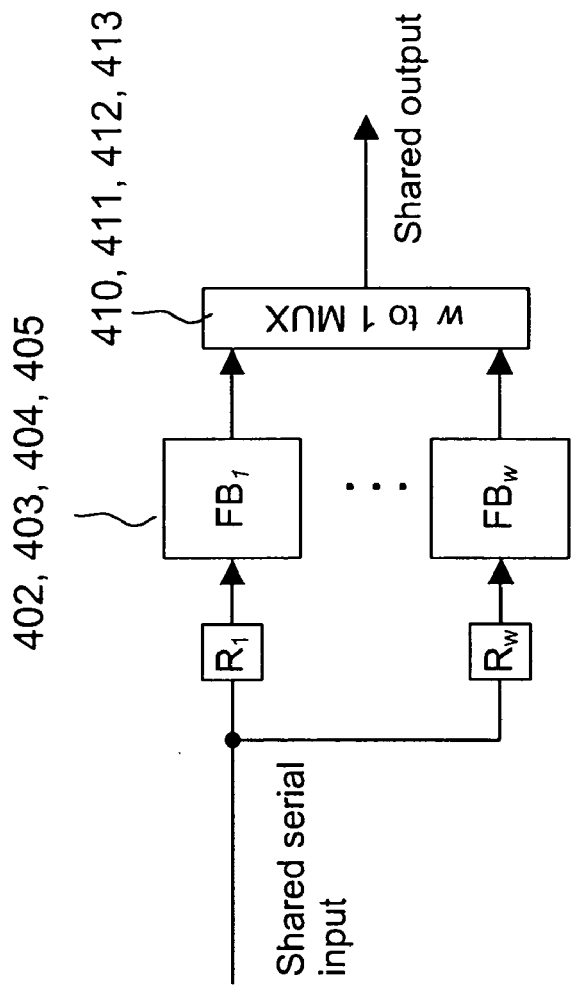
Figure 5A:
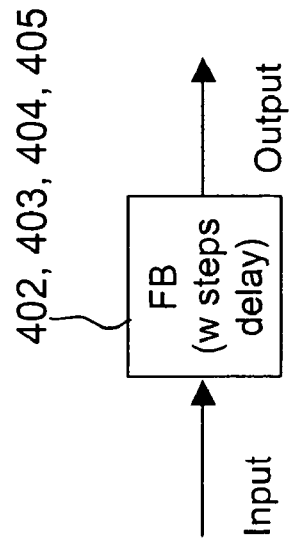
Figure 6A:
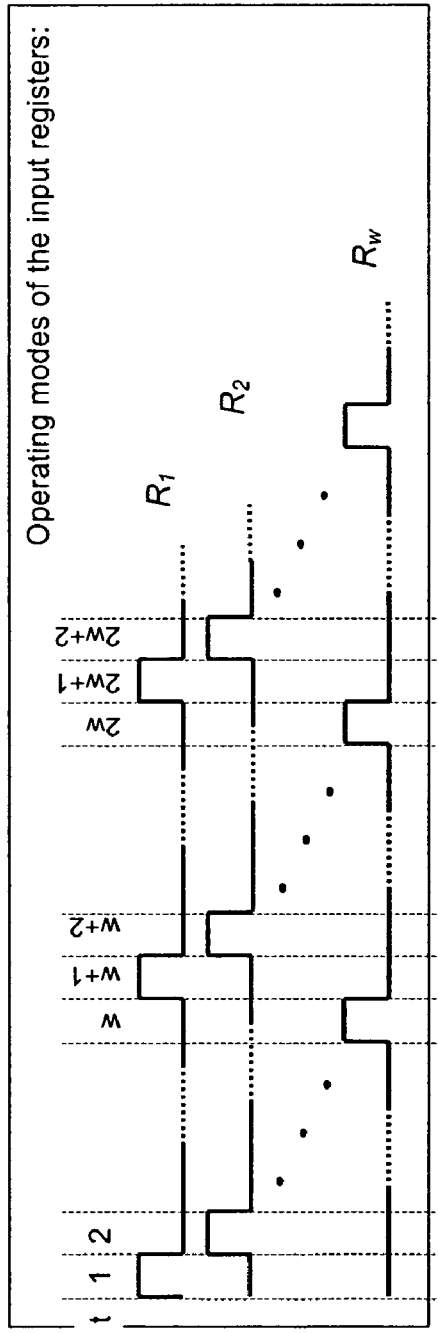
Figure 6B:
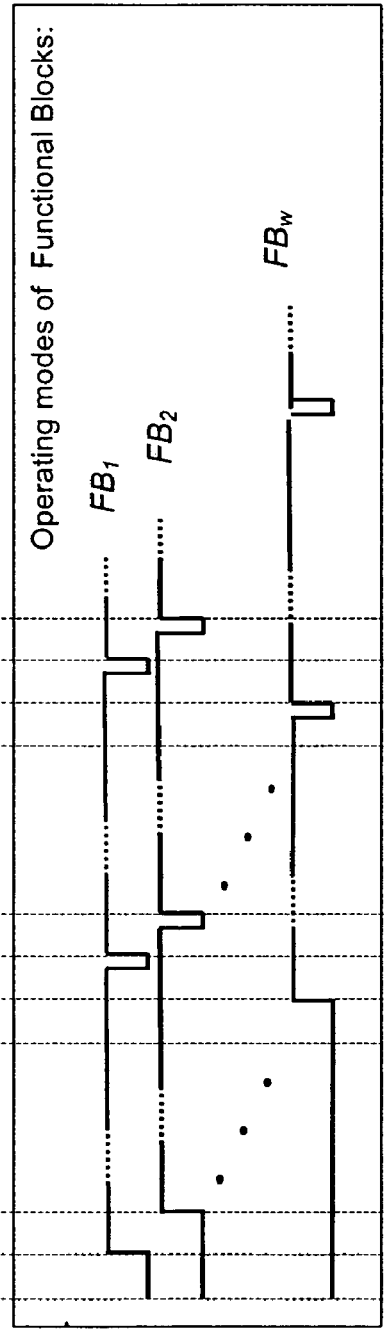
Figure 6C:
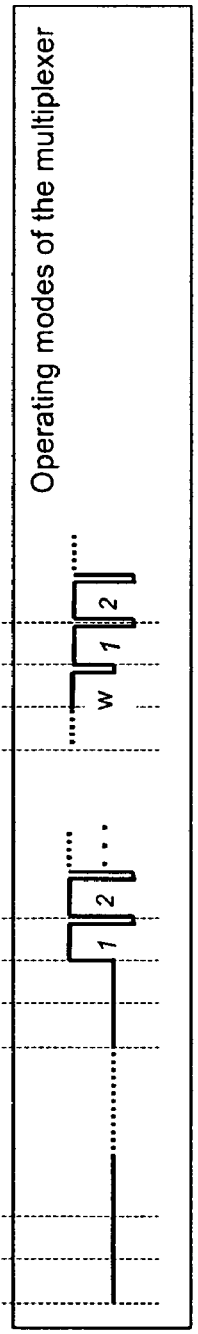
Figure 7:
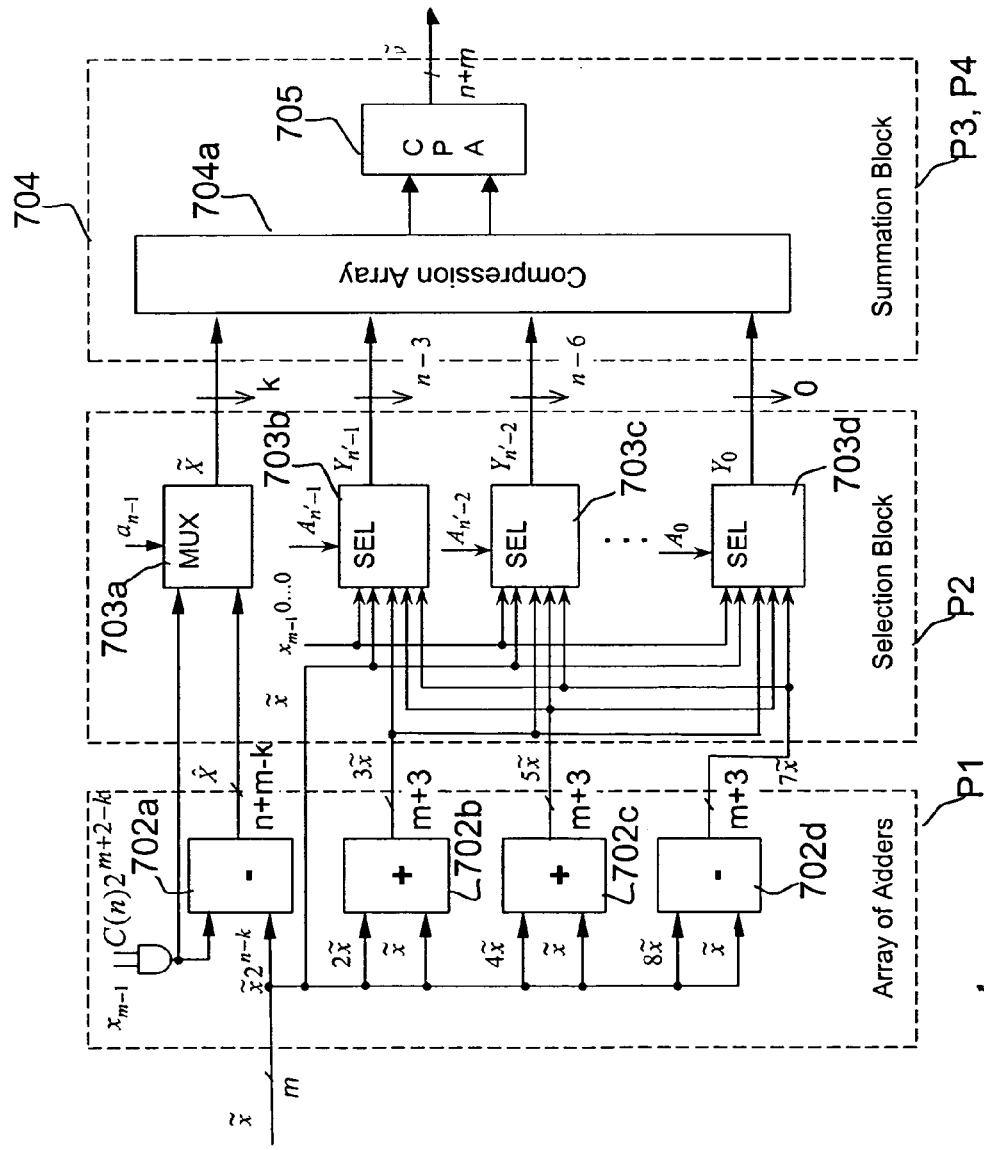
Figure 8:
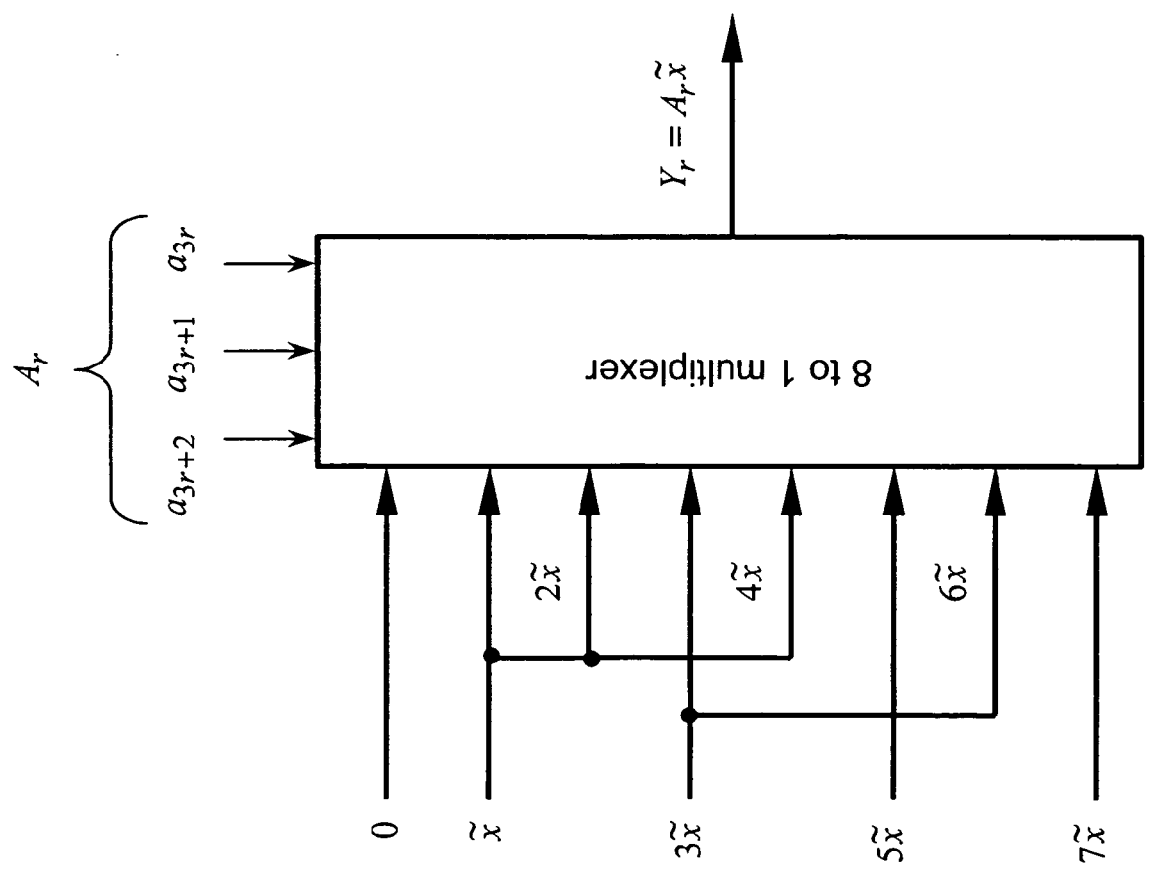
Figure 9:
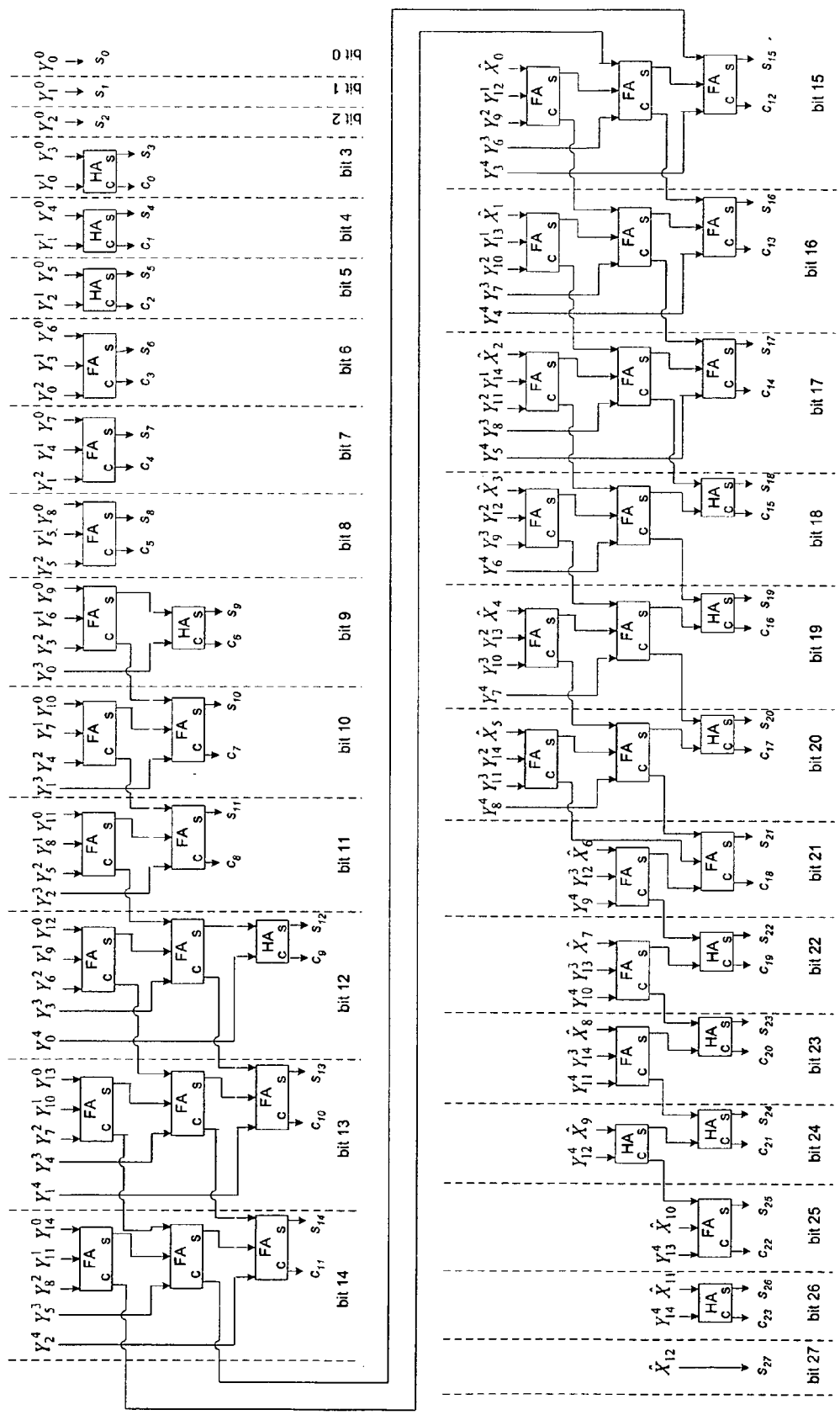
Figure 10:
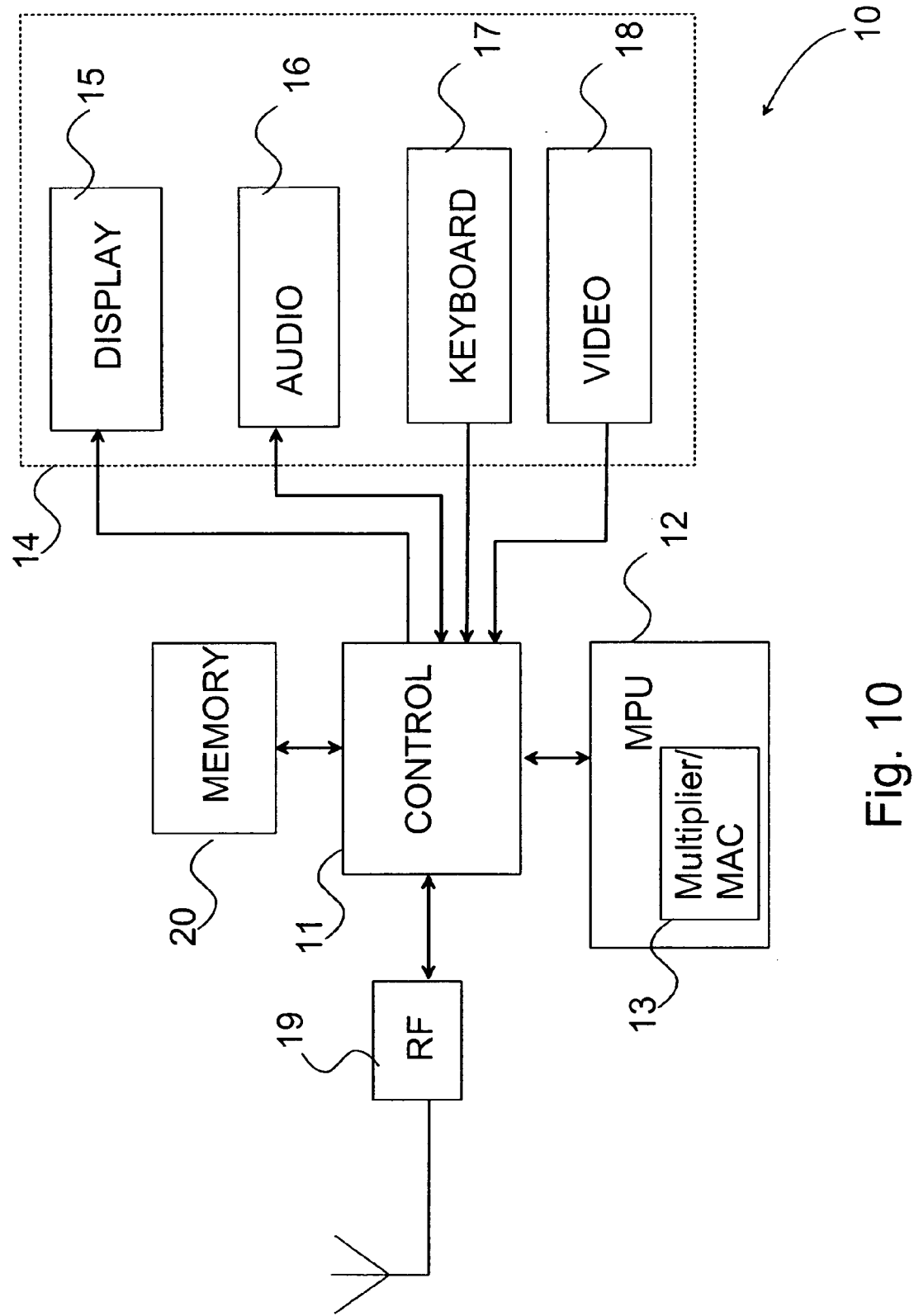
Figure 11:
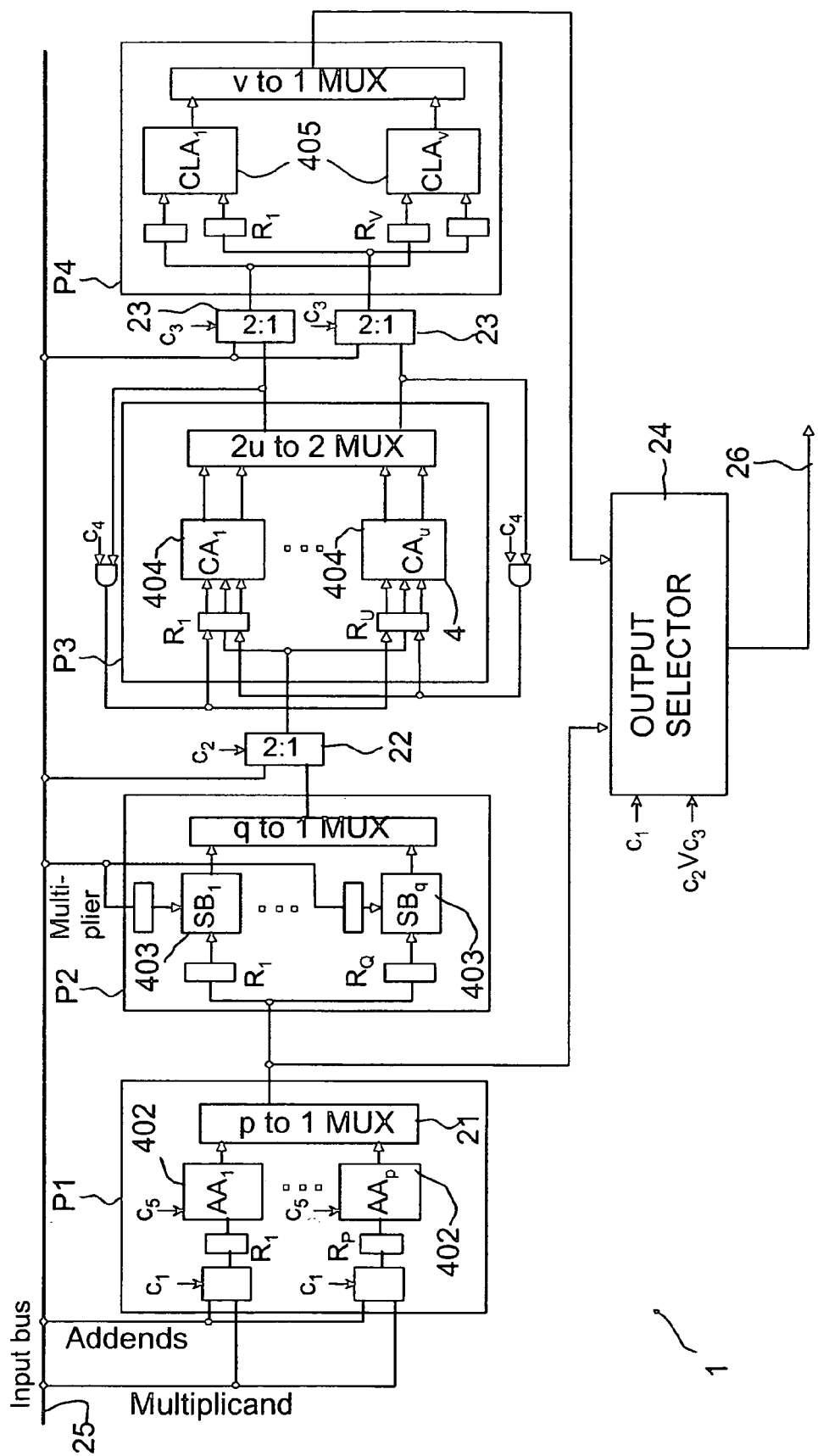

In the following the present invention will be described in more detail with reference to the appended drawings, in which FIG. 1 illustrates a typical structure of prior art radix-4 Booth recoded multipliers, FIG. 2 illustrates a general structure of radix-T Booth recoded (T≧8) or non-recoded (T≧4) multipliers, FIG. 3a illustrates one embodiment of the summation block within a parallel radix-T MAC unit structure, in which the summation block is implemented as a common Compression Array for n/t selected PP's and for feedback Sum and Carry terms, FIG. 3b illustrates another embodiment of the summation block within a parallel radix-T MAC unit structure, in which the summation block is implemented as a Splitted Compression Array, FIG. 4 illustrates as a simplified block diagram an advantageous embodiment of a device according to the present invention for plurality of multiplications/MAC operations, FIG. 5a is an illustration of a serial Functional Block, FIG. 5b is an illustration of a plurality of similar parallel Functional Blocks operating according to the principle of a delayed (interlaced) parallelism of the present invention, FIG. 6a shows as a timing diagram the operating modes of input registers within the delayed parallel Functional Block of FIG. 5b, FIG. 6b shows as a timing diagram the operating modes of Functional Blocks within the delayed parallel Functional Block of FIG. 5b, FIG. 6c shows as a timing diagram the operating modes of output multiplexer within the delayed parallel Functional Block of FIG. 5b, FIG. 7 illustrates an advantageous embodiment of type 1 radix-8 multiplier according to the present invention comprising an adder for negating the multiplicand, FIG. 8 illustrates an example embodiment of a SEL unit within the multiplier structure on FIG. 7, FIG. 9 illustrates a Compression array composed of Full and Half adders for the multiplier structure on FIG. 7 for a case m=13, n=16, FIG. 10 illustrates as a simplified block diagram a device according to an advantageous embodiment of the invention, and FIG. 11 illustrates as a simplified block diagram the general structure of the configurable device according to another embodiment of the present invention for plurality of multiplications/MAC operations.

DETAILED DESCRIPTION OF THE INVENTION

In the following, an advantageous embodiment of the present invention will be described in more detail. The general structure of the device according to the present invention is illustrated on FIG. 4. The device 401 comprises a set of different pipeline stages P1, P2, P3, P4. In this embodiment the device 401 comprises four pipeline stages but it should be evident in light of the teachings hereof that within the scope of the present invention the number of pipeline stages can be different than four.

The advantageous embodiment of the present invention used here as a non-restrictive example is a device for implementing a series of multiplications $y_i = a_i x_i$, $i=1, \ldots, k$, or a plurality of MAC operations, that is a vector-to-vector inner product $$s = \sum_{i=1}^{K} a_i x_i.$$

The device actually operates as a parallel array (a bank) of high-radix Booth recoded or non-recoded parallel multipliers or MAC units wherein some blocks are shared by the multipliers/MAC units of the array.

Pipelining is a common way to increase the throughput of the system for implementing a plurality of similar operations, e.g. multiplication and/or MAC. Considering a typical pipelined realization of a prior art radix-T Booth-recoded (T=8, 16) or non-recoded (T=4, 8) multiplier structures (FIG. 2), the first pipeline stage P1 would be the Array of s Adders with s given in Table 1a, the second stage P2 would be the Selection Block, the third stage P3 would be the Compression Array, and last several stages P4 (their number being different in different realizations) would constitute the Final Adder.

To apply the invention in a multiplication process, a new non-recoded radix-higher-than-four multiplication method for arbitrary signed two's complement integers has been derived by modifying the formula (3) as follows:

$$\tilde{y} = \sum_{r=0}^{n_{radix-T}-1} (A_r x) 2^{rt} = \sum_{r=0}^{\frac{n-1}{t}-1} \left( \left[ \sum_{i=0}^{t-1} a_{tr+i} 2^i \right] x \right) 2^{tr} - (a_{n-1} x) 2^{n-1}, \quad (7)$$

where $T = 2^t$ or as follows:

$$\tilde{y} = \sum_{r=0}^{n/t-2} \left( \left[ \sum_{i=0}^{t-1} a_{tr+i} 2^i \right] x \right) 2^{tr} + \left( \left[ -2^{t-1} a_{n-1} + \sum_{i=0}^{t-2} a_{n-t+i} 2^i \right] x \right) 2^{n-t} \quad (8)$$

If the formula (7) is used then there will be (n−1)/t+1 potential partial products where the first (n−1)/t potential partial products are nonnegative multiples $A_r x$, r=0, 1, ..., n/t−1, of the multiplicand with $A_r$ ranging between 0 and $2^t-1$ and the last potential partial product is $(-a_{n-1} x)$. If the formula (8) is used then there will be n/t potential partial products $A_r x$, r=0, 1, ..., n/t−1, where $A_r$ varies between 0 and $2^t-1$ for the first n/t−1 potential partial products, and between $-2^{t-1}$ and $2^{t-1}-1$ for the last potential partial product. In this case, only the most significant t+1 bits are Booth-like recoded, whereas other bits are just grouped by t. A multiplier based on either equations (7) or (8) would have similar structure to that shown on FIG. 2 with the difference in the Selection Block 203 and the number of potential partial products. Since the multiplier is not encoded, the Selection Block can simply be implemented as an array of multiplexers and, if formula (8) is used, only one row of Booth encoders/decoders for the most significant t+1 bits is needed. Since almost all of the potential partial products are nonnegative multiples of the multiplicand, there is no need for performing any addition of unity within the Summation Block, except for one bit if formula (8) is used. This makes the Selection Block much smaller and regular utilizing simpler interconnection network.

The advantageous embodiment of the device according to the present invention incorporates a plurality (bank) of multipliers/MAC units. The operation of the device depends on several parameters by appropriate selection of which the device with well-balanced pipeline stages can be designed. The general structure of the proposed variety of banks of radix-T Booth recoded (T=8, 16) or non-recoded (T=4, 8) multipliers is schematically shown on FIG. 4. The structure for a bank of multipliers/MAC units according to an advantageous embodiment of the present invention may in general be described as a pipelined device 401 wherein the first pipeline stage P1 comprises a plurality of, say p, Arrays of s Adders (AAs) 402, and all the Arrays of s Adders 402 share the same input lines 406. The second pipeline stage P2 is a plurality of, say q, Selection Blocks (SB's) 403, the third stage P3 is a plurality of, say u, Compression Arrays (CA's) 404, and the fourth pipeline stage P4 constitutes a plurality of, say v, final Carry-Look-Ahead adders (CLA's) 405. The basic Functional Blocks (AA's, SB's, CA's, and CLA's) can actually be the same as may be used in the corresponding type of prior art radix 4, 8 or 16 Booth recoded multipliers and/or MAC units or in the newly proposed radix 8 or 16 non-recoded multipliers/MAC units. Thus, the case p=q=u=v=1 corresponds to the case of a prior art multiplier/MAC unit structure. The main difference is that, in the advantageous embodiment of the device of the present invention, every basic block of the prior art structure is replaced with a plurality of different number of basic blocks. Blocks within one pipeline stage operate in the below described time-interlaced manner in such a way that throughputs of the pipeline stages may be varied in order to make them approximately equal to each other, and to match the desired operating step duration.

The principle of time-interlaced operation of a plurality of functional blocks is explained below with reference to FIGS. 4, 5a and 5b where FB indicates any of the basic Functional Blocks (AA, SB, CA, CLA) of multiplier/MAC structures. A functional block FB is to be used in a pipeline stage of a bigger system, and supposed to have an estimated delay of $D_{FB} \approx pT_{des}$ (but $D_{FB} \leq pT_{des}$) where $T_{des}$ is the desired operating step duration of the system. Then, in order to make the pipeline stage P1, ..., P4 operate with the throughput matching the duration of one step, the serial Functional Block may be replaced with a plurality $FB_1, FB_2, \ldots, FB_w$ of w Functional Blocks having pipeline registers (latches) $R_1, \ldots, R_w$ at their inputs 406, 407, 408, 409 and a w:1 multiplexer 410, 411, 412, 413 at their outputs. The parameter w depends on the pipeline stage in question. For the first pipeline stage P1 the parameter w corresponds to the parameter p i.e. there are p pipeline registers $R_1, \ldots, R_p$ and the multiplexer 410 of the first pipeline stage selects one of the p inputs to its output. For the second pipeline stage P2 the parameter w corresponds to the parameter q i.e. there are q pipeline registers $R_1, \ldots, R_q$ and the multiplexer 411 of the second pipeline stage P2 selects one of the q inputs to its output, respectively.

For the third pipeline stage P3 the parameter w corresponds to the parameter u i.e. there are u pipeline registers $R_1, \ldots, R_u$ and the multiplexer 412 of the third pipeline stage P3 comprises two multiplexers (not shown) each of which select one of the u inputs to its output. For the fourth pipeline stage P4 the parameter w corresponds to the parameter v i.e. there are v pipeline registers $R_1, \ldots, R_v$ and the multiplexer 413 of the fourth pipeline stage P4 selects one of the v inputs to its output 414. The shared input 406, 407, 408, 409 to the pipeline stage P1, P2, P3, P4 is connected to every of w pipeline registers $R_1, \ldots, R_w$. However, every of these registers is open only one out of every w operating steps with a time offset of one operating step. This is shown on FIG. 6a as a timing diagram. This way, at every operating step, the input I is actually connected to the input of only one Functional Block while the other connections are inactive since the input registers of all the other Functional Blocks within their plurality forming the considered pipeline stage are closed for writing. The register $R_1$ at the input of the first functional block $FB_1$ is open during the first of every w operating steps, the register $R_2$ at the input of the second functional block $FB_2$ is open during the second of every w operating steps, etc. In general, at the operating step t=1, 2, ..., K, the input I is actually connected to the input of only the $FB_f$, where f=(t−1)mod w+1. Thus, the input I is spatially shared but temporally distributed among the functional blocks $FB_1, \ldots, FB_w$ of the considered pipeline stage. During the operation of the system, at the operating step t=1, 2, ..., K, one sample $X_t$ of the input data stream to that stage enters to the functional block $FB_f$, f=(t−1)mod w+1 which is initiated at that stage as shown in the timing diagram of FIG. 6b. Once the $FB_f$ completes its operation over $X_t$ at the end of the operating step t+w−1, t=1, 2, ..., K, the w:1 multiplexer 410, 411, 412, 413 at the outputs of the functional blocks passes the results obtained in $FB_f$ to the output of the stage at the next operating step t+w, t=1, 2, ..., K. For this reason the multiplexer 410, 411, 412, 413 operates according to circular mod w rule as illustrated on FIG. 6c.

The output of the first pipeline stage P1 is connected to the input of the second pipeline stage P2. Respectively, the output of the second pipeline stage P2 is connected to the input of the third pipeline stage P3, and the output of the third pipeline stage P3 is connected to the input of the fourth pipeline stage P4. The output of the last pipeline stage, i.e. the fourth pipeline stage P4 in the device according to the advantageous embodiment of the present invention, is connected to the output of the system.

Thus, by replacing every functional block of a prior art multiplier/MAC unit structure with a plurality of similar functional blocks and by making use of the principle of time-interlaced operation, better balancing of the pipeline stages may be achieved with respect to a predetermined operating step duration by appropriate selection of the numbers of blocks within every pipeline stage (that is, parameters p, q, u, and v). Supposed that the delays of the four pipeline stages within a prior art multiplier/MAC unit structure are $D_{AA}, D_{SB}, D_{CA}, D_{CLA}$, respectively, and the desired throughput of the system is $N_{des}$ multiplications/MAC operations per second, then the desired operating step duration will be chosen to be $T_{des}$ seconds, so that $T_{des} \leq 1/N_{des}$, and the mentioned design parameters will be selected as $p=\lceil D_{AA}/T_{des} \rceil$, $q=\lceil D_{SB}/T_{des} \rceil$, $u=\lceil D_{CA}/T_{des} \rceil$, and $v=\lceil D_{CLA}/T_{des} \rceil$, in which the notation $\lceil x \rceil$ means rounding up to the next integer value.

The surface area of the proposed multiplier/MAC unit structure operating at clock $T_{des}$ can be estimated as:

$$S_{prop} = pS_{AA} + qS_{SB} + uS_{CA} + vS_{CLA} + S_{overhead},$$

where $S_{AA}, S_{SB}, S_{CA},$ and $S_{CLA}$ are the areas of the corresponding blocks, and $S_{overhead}$ is the overhead of the interconnection and control means for integrating plurality of functional blocks into every pipeline stage.

On the other hand, in a single conventional high-radix pipelined multiplier, the throughput can be defined as $N_{pipe} = 1/T_{pipe}$, where $T_{pipe} = \max\{D_{AA}, D_{SB}, D_{CA}, D_{CLA}\}$. Even if $N_{pipe} \geq N_{des}$, meaning a single pipelined multiplier may handle the task, the structure would suffer from low balancing between stages due to big differences between $D_{AA}, D_{SB}, D_{CA}, D_{CLA}$ as can be seen from Table 1a. The poor balancing leads to low hardware utilization and, therefore, to power consumption inefficiency. However, for example, in signal processing, throughputs several times higher than that provided by a single, even pipelined, multiplier are needed. This means that in many cases a signal processing system would have to include an array (bank) of $$n = \left\lceil \frac{N_{des}}{N_{pipe}} \right\rceil$$

independent multipliers/MAC units. Clearly, n=max{p,q,u,v}. The total area of the conventional array of multipliers/MAC units would then be estimated as:

$$S_{conv} = n(S_{AA} + S_{SB} + S_{CA} + S_{CLA}) + S_{overhead}.$$

Comparing $S_{prop}$ and $S_{conv}$ it can be seen that a significant savings in the areas of the structures according to the invention can be achieved as compared to the conventional arrays of independent multiplier/MAC units. The advantages of the present invention can be achieved not only in signal processing (such as image/video processing) but also in other processes in which real-time multiplication operations are needed.

Thus, the method according to the advantageous embodiment of the present invention provides better balancing of the pipeline stages P1 to P4, and enables to increase the throughput of a single high-radix pipelined multiplier/MAC unit with a minimum extension of the area. The throughput of the structure is increased faster than the area because of better hardware utilization achieved by better balancing of pipeline stages. In addition, it should be noted that the throughput is increased without the need to increase the input/output bus width, which is critical since many Digital Signal Processors provide rather narrow bus widths.

FIG. 7 presents an exemplary realization of the type 1 non-recoded (i.e. based on Eq. (7)) radix-8 multiplier structure (NR1, T=8) in which the present invention is utilized. The operation of the multiplier 701 is based on the following observation.

Let $\tilde{a} = a_{n-1}a_{n-2}\ldots a_1a_0$ and $\tilde{x} = x_{m-1}x2\ldots x_1x_0$ be the two's complement representations of the n-bit (including the sign bit) multiplier a and the m-bit (including the sign bit) multiplicand x, respectively. Let also the multiplier be sign extended so that n=3n'+1 (n' is an integer). Then the (n+m)-bit (including the sign bit) two's complement representation of the product y=a·x can be obtained as:

$$\tilde{y} = \sum_{r=0}^{n'-1} \tilde{Y}_r 2^{3r} + 2^k \tilde{X}$$

where $$\tilde{Y}_r = \begin{cases} x_{m-1} \overbrace{00\ldots0}^{m+2 \text{ times}}, & \text{if } A_r = 0 \\ \langle A_r \cdot \tilde{x}\rangle_{(m+2)}, & \text{otherwise} \end{cases}$$

$$A_r = a_{3r+2}a_{3r+1}a_{3r} = 2^2 a_{3r+2} + 2a_{3r+1} + a_{3r},\ r=0,\ldots, n'-1,$$

are partial product values which are formed from the least significant m+2 bits of the two's complement representation of the number $A_r \cdot \tilde{x}$, k=min{n−1, m+2}, and $\tilde{X}$ is the sign correction term given by $$\tilde{X} = (x_{m-1}C(n)2^{m+2-k} - a_{n-1}x2^{n-k})$$
$$= \begin{cases} x_{m-1}C(n)2^{m+2-k} & \text{if } a_{n-1} = 0 \\ x_{m-1}C(n)2^{m+2-k} - x2^{n-k} & \text{if } a_{n-1} = 1 \end{cases}$$

where $$C(n) = -\frac{2^n - 1}{7} = 1\ \underbrace{011\ 011\ldots 011}_{n'-1 \text{ times}}\ 1.$$

It should be noted that, if $A_r \neq 0$, the values of $\tilde{Y}_r$, r=0, ..., n'−1 are obtained by cutting the sign bits of $A_r \cdot \tilde{x}$ which are collected in the term $x_{m-1}C(n)2^{m+2-k}$. However, if $A_r$=0, negative (10 . . . 0) or positive (00 . . . 0) should be used according to the sign of the multiplicand x According to the above observation the following multiplication algorithm can be used.

Algorithm 1.

The two's complement value $\tilde{a} = a_{n-1}a_{n-2}\ldots a_1 a_0$ (n=3n'+1) of the multiplier a and the two's complement value $\tilde{x} = x_{m-1}x_{m-2}\ldots x_1 x_0$ of the multiplicand x are provided as input data to the Algorithm 1. Then the output of the Algorithm 1 will be the two's complement value $\tilde{y} = y_{m+n-1}y_{m+n-2}\ldots y_1 y_0$ of the product y=a·x. The Algorithm 1 comprises the following steps:

Step 1. First, potential partial products $3\tilde{x}=2\tilde{x}+\tilde{x}$, $5\tilde{x}=4\tilde{x}+\tilde{x}$ and $7\tilde{x}=8\tilde{x}-\tilde{x}$ will be formed. This can be performed by combination means such as adders/subtracters 702b, 702c, 702d, respectively. Also the sign correction term $\hat{X}=x_{m-1}C(n)2^{m+2-k}-x2^{n-k}$ in its two's complement form will be formed e.g. by the first adder/subtracter 702a. The values $2\tilde{x}$, $4\tilde{x}$, and $8\tilde{x}$ can be obtained by shifting the multiplicand x one, two and three positions to the left, respectively. The value $6\tilde{x}$ can be obtained by shifting the value $3\tilde{x}$ one position to the left. Essentially, all the potential partial product values 0, $\tilde{x}$, $2\tilde{x}$, $3\tilde{x}$, $4\tilde{x}$, $5\tilde{x}$, $6\tilde{x}$, and $7\tilde{x}$ of the multiplicand x with an arbitrary 3-bit nonnegative number are obtained at this stage. Every number obtained at this stage is the result of one addition or subtraction with one operand being $\tilde{x}$, and the other being $\tilde{x}$ shifted to the left for a certain number of positions. Thus this stage may be implemented in an array of four parallel adders/subtracters 702a, 702b, 702c, 702d in one operating step.

Step 2. According to every group of three consecutive bits $A_r = a_{3r+2}a_{3r+1}a_{3r}$, r=0, ..., n'−1 of the multiplier, n' partial products $\tilde{Y}_r = \langle A_r \cdot \tilde{x}\rangle_{(m+2)}$ are then selected from the list of all potential partial product values 0, $\tilde{x}$, $2\tilde{x}$, $3\tilde{x}$, $4\tilde{x}$, $5\tilde{x}$, $6\tilde{x}$, and $7\tilde{x}$ obtained at the first step. The selection can be performed by the selection means 703b, 703c, 703d. Also, if $a_{n-1}$=0 then the value of the sign correction term will be set to $\tilde{X}=x_{m-1}C(n)2^{m+2-k}$, otherwise (if $a_{n-1}$=1) $\tilde{X}=\hat{X}$ where $\hat{X}$ was obtained at the first step. This can be performed by the first selection means 703a which selects either of its inputs $\tilde{X}=x_{m-1}C(n)2^{m+2-k}$, $\tilde{X}=\hat{X}$ to the output according to the value of $a_n$. The partial products $\tilde{Y}_r$ are (m+2)-bit numbers formed from $A_r \cdot \tilde{x}$ by cutting the sign bit and thus they are always positive numbers irrelevant of the sign of x.

Step 3. The product $\tilde{y}$ will now be defined by summing up the n' selected partial products $\tilde{Y}_r$, r=0, ..., n'−1, and the value of $\tilde{X}$. Before the summing is performed e.g. in the compression array 704a the values of $\tilde{Y}_r$ are multiplied by $2^r$ and the value of $\tilde{X}$ is multiplied by $2^k$. These multiplications are depicted as shift operations using the arrows between the Selection Block 703 and the Summation Block 704 in FIG. 7. There are totally n'+1=⌈n/3⌉+1 numbers (partial product rows) to be added at the Step 3 of the multiplication method according to the invention while in the Booth multiplication method this number is ⌈n/2⌉ or ⌈n/2⌉+1 depending on how the sign extensions are handled. Moreover, since the partial product values as well as the sign correction term are shifted by 3 positions with respect to each other, some of these rows may be merged. For example, the two rows 000101 and 011000 can be merged into the following one: 011101. It can easily be shown that after merging the total number of partial product rows is min{⌈m/3⌉, ⌈n/3⌉}+1. Since all the partial products $\tilde{Y}_r$ are positive and $2^k\tilde{X}$ is an (m+n)-bit number no sign extensions are needed in implementing the summation. Other ways of forming and summing the value of the sign correction term are possible which should, however, be considered as minor variations from the Algorithm 1. Clearly, the proposed multiplication method can easily be extended to multiply-accumulate (MAC) method if the result of the Step 3 is added to the previous results.

The multiplier 701 on FIG. 7 is based on the Algorithm 1. It comprises an Array of Adders 702 for computing the sign correction term $\hat{X}$ and the set of potential partial products 3$\tilde{x}$, 5$\tilde{x}$, and 7$\tilde{x}$ from the multiplicand $\tilde{x}$, a Selection Block 703 for forming the set of partial products $\tilde{Y}_r$, r=0, ..., n'−1, and the term $\tilde{X}$ according to the bits of the multiplier $\tilde{a}$, and a Summation Block 704 that computes the product $\tilde{y}$ by summing up the outputs $\tilde{Y}_r$ and $\tilde{X}$ of the Selection Block 703 preliminary shifting to the left the value of $\tilde{Y}_r$ for 3r positions and the value of $\tilde{X}$ for K positions.

The multiplier structure of FIG. 7 can easily be extended to a multiply-accumulate structure by including a feedback from the outputs of the entire Summation Block or the Compression Array to its inputs in order to accumulate the sum of the values from the Selection Block 703 to the value obtained at the previous operating step.

Different realizations of different blocks of the multiplier structure on FIG. 7 are possible. In the following it will be assumed that the multiplicand $\tilde{x}$ enters to every of the four adders/subtracters 702a, 702b, 702c, 702d of the Array of Adders 702 in the bit-parallel manner with possible shifts. The first adder 702a implements subtraction of $\tilde{x}2^{n-k}$ from the constant $x_{m-1}C(n)2^{m+2-k}$ resulting in $\hat{X}$. This adder 702a could be replaced by m inverters if adding the value of $a_n$ is implemented in the Summation Block 704. The second 702b and the third adders 702c receive x̃ at their second inputs, and x̃ shifted to the left, respectively for one or for two positions at their first inputs (adders with only one input can also be considered). The result is 3x̃ and 5x̃, respectively. Similarly, the fourth adder 702d implements subtraction of x̃ from 8x̃ resulting in 7x̃. The Array of Adders 702a, 702b, 702c and 702d constitutes the first pipeline stage P1.

Outputs of the Array of Adders 702 enter to the Selection block 703, which, in the present embodiment, constitutes the second pipeline stage P2 and comprises an (n+m−k)-bit 2:1 multiplexer 703a and n' selection units (SEL) 703b, 703c, 703d. The multiplexer 703a has X̃ at its first input and $X_{m-1}C(n)2^{m+2-k}$ at its second input, and is controlled by $a_n$ so that it will have the term $\tilde{X}=x_{m-1}C(n)2^{m+2-k}-a_{n-1}x2^{n-k}$ at its output. Every selection unit 703b, 703c, 703d has the values of 0, x̃, 3x̃, 5x̃, and 7x̃ at its inputs and is controlled by corresponding three bits of the multiplier ã. The output is formed according to the Table 3.

TABLE 3

| | Selected input | | | |
|---|---|---|---|---|
| $A_r$ | Number | Value | Left shift | Output value |
| 000 | 0 | 0 | 0 | $x_{m-1}0 \ldots 0$ |
| 001 | 1 | x̃ | 0 | x̃ |
| 010 | 1 | x̃ | 1 | 2x̃ |
| 011 | 2 | 3x̃ | 0 | 3x̃ |
| 100 | 1 | x̃ | 2 | 4x̃ |
| 101 | 3 | 5x̃ | 0 | 5x̃ |
| 110 | 2 | 3x̃ | 1 | 6x̃ |
| 111 | 4 | 7x̃ | 0 | 7x̃ |

FIG. 8 presents a non-restrictive example of a circuitry which can be implemented as the selection unit 703b, 703c, 703d. The circuitry consists of an 8 to 1 multiplexer some of the inputs of which are formed by shifting the bits of some of the other inputs. In general, the selection unit 703b, 703c, 703d can be any circuitry that operates according to Table 3.

The Summation Block 704 of the present embodiment of the multiplier structure according to the present invention is composed of a compression array (CA) 704a followed by an adder 705 (later on referred to as the final adder). The Summation Block 704 constitutes the third P3 and fourth pipeline stages P4 of the structure. The compression Array 704a reduces the n'+1 partial product rows into two rows. It may be constructed from 3:2 ratio full adders (FAs), half adders (HAs), and/or 4:2 ratio compressors. Different techniques for constructing compression arrays and the final adder that may be used within the present embodiment are known from prior art. However, it should be noted, that the number of rows to be added within the Summation Block is smaller than in the prior-art radix-4 Booth recoded multipliers. Correspondingly, the numbers of levels within the Compression Arrays and, therefore their delay and size are significantly reduced. For example, in the case of 13-bit multiplicand (m=13) and 16-bit multiplier (n=16), the numbers of rows to be added are reduced from 9 to 6 and from 11 to 8 when using the radix-8 method instead of radix-4 method for multiplier and for MAC unit implementations, respectively. An example of a possible compression array composed of full and half adders for this case is depicted on FIG. 9. In the considered example the numbers of levels (the delays) are reduced from 4 to 3 (from 8t to 6t, t being the NAND gate delay) and from 5 to 4 (from 10t to 8t) when comparing to the state-of-the-art radix-4 Booth multipliers and MAC units, respectively. The number of full adders (FAs) and the number of half adders (HAs) are reduced from 72 and 14 to 36 and 13 in the case of the 13×16 multiplier when using the radix-8 method instead of radix-4 method.

TABLE 4

| Structure | Delay of the PP generat. | Delay of the CA | Delay of the final add. | CC duration | CC's/latency for one multiply or one MAC | CC's/latency for K multiplies or p-length vector multiplication |
|---|---|---|---|---|---|---|
| Prior art Radix-4 Booth multiplier, p = q = v = u = 1 | 6t | 8t (4 levels) | 8t (7 stages) | 8t | 9/72t | K + 8 = 40/320t |
| Prior art radix-8 NR1 multiplier, p = q = v = u = 1 | 24t | 6t (3 levels) | 22t (3 stages) | 24t | 4/96t | K + 4 = 36/864t |
| Proposed multiplier, p = 2, q = v = u = 1 | 12t | 6t (3 levels) | 12t (5 stages) | 12t | 7/84t | K + 6 = 38/456t |
| Proposed multiplier, p = 3, q = v = u = 1 | 8t | 6t (3 levels) | 8t (7 stages) | 8t | 9/72t | K + 8 = 40/320t |
| Proposed multiplier, p = 4, q = v = u = 1 | 6t | 6t (3 levels) | 6t (10 stages) | 6t | 12/72t | K + 11 = 43/258t |
| Prior art Booth MAC | 6t | 10t (5 levels) | 10t (7 stages) | 10t | 9/90t | K + 8 = 40/400t |
| Prior art radix-8 NR1 MAC, p = q = v = u = 1 | 24t | 8t (4 levels) | 22t (3 stages) | 24t | 5/120t | K + 4 = 36/864t |
| Proposed MAC, p = 2, q = v = u = 1 | 12t | 8t (4 levels) | 12t (6 stages) | 12t | 8/96t | K + 7 = 39/468t |
| Proposed MAC, p = 3, q = v = u = 1 | 8t | 8t (4 levels) | 8t (8 stages) | 8t | 10/80t | K + 9 = 41/328t |
| Proposed | 6t | 8t | 8t | 8t | 10/80t | K + 9 = 41/328t |

TABLE 4-continued

| Structure | Delay of the PP generat. | Delay of the CA | Delay of the final add. | CC duration | CC's/latency for one multiply or one MAC | CC's/latency for K multiplies or p-length vector multiplication |
|---|---|---|---|---|---|---|
| MAC, p = 4, q = v = u = 1 Proposed | 4t | (4 levels) 4t | (8 stages) 4t | 4t | 6/24t | K + 7 = 39/156t |
| MAC, p = 6, q = 1, v = 2, u = 4 | | (4 levels) | (4 × 4 stages) | | | |

TABLE 5

| Structure | Number of FAs + Number of HAs | | | | Booth Encode | Booth Decode |
|---|---|---|---|---|---|---|
| | 1$^{st}$ stage, PP generat. | 2$^{nd}$ stage, CA | 3$^{rd}$ stage, final add. | Total | | |
| Prior art Booth multiplier | Non | 72 + 14 | 28 | 100 + 14 | 8 | 96 |
| Proposed multiplier, p = 1 | 4 × 13 | 36 + 13 | 28 | 116 + 13 | Non | Non |
| Proposed multiplier, p = 2 | 8 × 13 | 36 + 13 | 28 | 168 + 13 | Non | Non |
| Proposed multiplier, p = 3 | 12 × 13 | 36 + 13 | 28 | 223 + 13 | Non | Non |
| Proposed multiplier, p = 4 | 16 × 13 | 36 + 13 | 28 | 272 + 13 | Non | Non |

| Structure | MUXs (SB) | | | | INV | AND/OR | | | Gates, total |
|---|---|---|---|---|---|---|---|---|---|
| | 2:1 | 3:1 | 4:1 | 8:1 | | 2 | 3 | 4 | |
| Prior art Booth multiplier | 3 | 0 | 0 | 0 | 24 | 30 | 32 | 8 | 1225 |
| Proposed multiplier, p = 1 | 15 | 0 | 0 | 75 | 26 | 13 | 0 | 0 | 1630 |
| Proposed multiplier, p = 2 | 75 | 0 | 0 | 75 | 52 | 13 | 0 | 0 | 2040 |
| Proposed multiplier, p = 3 | 15 | 60 | 0 | 75 | 78 | 13 | 0 | 0 | 2460 |
| Proposed multiplier, p = 4 | 15 | 0 | 60 | 75 | 104 | 13 | 0 | 0 | 2750 |

Table 4 presents a comparison of estimated time characteristics and Table 5 presents estimated hardware resources and the gate count comparison of type 1 non-recoded radix-8 multiplier and MAC unit structures according to the advantageous embodiment of the present invention (Proposed multiplier) with the prior art Booth multiplier and Booth MAC unit structures for the case of the 13-bit multiplicand (m=13) and 16-bit multiplier (n=16), and K=32 multiplications to be accumulated with the MAC unit. Both these Tables have been created in an assumption that standard carry-ripple adders are used within the first pipeline stage and pipelined adders are used as final adders (with the number of stages indicted in Table 4). As one can see the delay (6t) of the compression array of the radix-8 multiplier is smaller than in the case of the radix-4 Booth multiplier (8t). However, if only one Array of Adders is used, the overall delay (864t) is significantly bigger than that of the radix-4 Booth multiplier (320t) because the operating step duration is determined by the delay of the first pipeline stage (24t).

Clearly the pipeline stages are purely balanced. Also, from Table 5, the overall gate count (1630G) of the radix-8 multiplier is bigger than the gate count of the radix-4 Booth multiplier (1225G) primarily because of the Selection Block.

On the other hand including more Arrays of Adders in the structure almost proportionally smaller delay of the radix-8 multiplier may be achieved with smaller than proportional increase in the gate count. When including p=4 Arrays of Adders, a better balancing between pipeline stages is achieved and the overall delay (258t) becomes 3.34 times smaller (but almost 4 times smaller for bigger K) than in the case of p=1 Array of Adders. It should be noted that the gate count is only 2750/1630=1.67 times increased. In the case of the MAC unit, the best balancing between stages is achieved for the case p=6, q=1, v=2, u=4 meaning that six Arrays of Adders and two Compression Arrays are utilized. In this case, approximately 5.54 times faster performance is achieved with the expense of approximately 2.65 times increase in the gate count compared to the case p=q=v=u=1.

The structure according to the present invention can be used in many different systems and devices. Advantageously, it can be used in video encoding/decoding systems to perform many of the resource demanding calculation operations. The parameters p, q, u, v can be selected according to the special demands of the system so that the most optimum delays for each pipeline stage P1, ..., P4 may be obtained.

The invention can be implied, for example, as a separate unit comprising the different pipeline stages P1, ..., P4. Within each pipeline stage there are the necessary functional units the amount of which depends on the application in question. The invention can also be implied in a digital signal processor (DSP), in a microprocessor (MPU), in an application specific integrated circuit (ASIC), or such.

In the following, another advantageous embodiment of the present invention will be described in more detail. The general structure of this embodiment of the device according to the present invention is illustrated on FIG. 11. The main difference is that this device is configurable meaning that it may comprise different subset of the main blocks (pipeline stages). This is achieved by including one or more selection means e.g. multiplexers 21, 22, 23 at the inputs of the first P1, third P3, and the fourth pipeline stages P4. The multiplexers 21, 22, 23 are advantageously 2:1 multiplexers. They are controlled by signals $c_1$, $c_2$, and $c_3$, respectively. The structure comprises also an output selector 24 which is controlled by the first control signal $c_1$ and an OR-combination of the second $c_2$ and the third control signals $c_3$ (i.e. $c_2 \vee c_3$). The output selector 24 selects the data from the output of the first P1 or from the last pipeline stage P4 to be connected to the output bus 26 of the structure. The first inputs of the multiplexers 21, 22, 23 are connected to corresponding lines of the input bus 25 of the structure, and the second inputs of the multiplexers 21, 22, 23 are connected so that if the second inputs are activated, the structure operates as a multiplication/MAC operation device. Thus different configurations of the structure are possible for different sets of control signals $c_1$, $c_2$, and $c_3$. The dependence of the configuration on these signals is as follows.

When all the control signals $c_1$, $c_2$, $c_3$ are set to logical 1-state, i.e. $c_1=c_2=c_3=1$, the structure behaves as a multiplication/MAC operation device. In a situation in which the first control signal $c_1$ is in logical 0-state and the other two control signals $c_2$, $c_3$ are in logical 1-state, i.e. $c_1=0$; $c_2=c_3=1$, the structure behaves as an array of sp adder/subtracters. Only the first pipeline stage P1 (i.e. the array of adders 2) is activated while the others are idle. The third alternative is that the first control signal $c_1$, is set to logical 1-state while the second $c_2$ and the third control signals $c_3$ are set to logical 0-state ($c_1=1$; $c_2=c_3=0$). This means that the structure behaves as an accumulator. Only compression arrays 404 and the final adders 405 operate while the arrays of adders 402 and the selection blocks 403 are idle. In the fourth alternative the first $c_1$ and second control signals $c_2$ are both set to logical 1-state and the third control signal $c_3$ is set to logical 1-state ($c_1=c_2=1$:$c_3=0$). In that situation the structure behaves as a plurality of fast adders of a wide precision. Yet in another alternative, when $c_1=c_2=c_3=0$, the structure simultaneously behaves as an array of sp adders/subtractors and an accumulator. It is obvious that the above mentioned selection means 22, 23, 24 as well as the dependence of the structure/operation modes on the states of the control signals $c_1$, $c_2$, $c_3$ are just one possible alternative but also other alternatives can be applied within the scope of the present invention. This also applies to other control signals which will be described later in this description.

In the structure of FIG. 11 there are two other control signals $c_4$ and $c_5$ which add multifunctionality to the structure without reconfiguring it. The fourth control signal $c_4$ activates (if e.g. $c_4=1$) or disactivates (if e.g. $c_4=0$) feedback loops between outputs and inputs of compression arrays 404 within the third pipeline stage P3. Thus the structure operates as a multiplier if $c_1=c_2=c_3=1$, $c_4=0$ and it operates as a MAC unit if $c_1=c_2=c_3=c_4=1$. The fifth control signal $c_5$ (which may be a 1-, 2-, or 3-bit signal) controls the precision of the adder/subtracters within the first pipeline stage P1 by permitting (corresponding bit of $c_5$ is e.g. logical 1) or stopping (corresponding bit of $c_5$ is e.g. logical 0) carry propagation between blocks of full adders 405. This way, the plurality of arrays of adders containing sp adders/subtracters for m-bit inputs may also operate as a plurality of 2sp adders/subtracters for (m/2)-bit inputs or as a plurality of 4sp adders/subtracters for (m/4)-bit inputs, etc. It is also possible that selection blocks 403, compression arrays 404, and the final adders 405 may slightly be modified and made controllable by the same signal $c_4$ also allowing implementation of various precision multiplication/MAC operations.

The structure of the present invention can be implemented e.g. as an integrated circuit, by using one or more processors, logic circuitry and memories, etc.

FIG. 10 depicts a device 10 according to an advantageous embodiment of the present invention. It comprises a control unit 11 for controlling the operations of the device 10. The device also comprises a microprocessor unit 12 that contains a multiplier or a Multiply-Accumulate unit 13 (MAC), or a reconfigurable device according to an advantageous embodiment of the present invention. The user interface 14 of the device comprises display means 15, audio means 16, a keyboard 17, and e.g. a video camera 18. The device 10 comprises communication means 19 such as mobile communication means, to communicate with a communication network (not shown) and to exchange information with another device (not shown) known as such. The memory means 20 are used to store different kind of data and programs, such as operating commands for the control unit 11.

The device can be, for example, a wireless terminal, a computing device, etc.

The present invention is not limited solely to the above described embodiments, but it can be modified within the scope of the appended claims.

The invention claimed is:

1. Method for performing a multiplication operation in a pipelined manner comprising:
    dividing said multiplication operation into at least a first and a second calculation operation;
    dividing at least one of said first and second calculation operations into at least a first and a second subopera-tion;
    performing at least one of said first and second subop-erations in a time-interlaced manner in one pipeline stage, where the second suboperation is started before the first suboperation is finished; and
    using a high-radix multiplication as said calculation operation.

2. A method according to claim 1, comprising configuring data routing between pipeline stages.

3. A method according to claim 1, comprising performing said multiplication operations in at least two pipeline stages.

4. A method according to claim 1, comprising performing said multiplication operation and another multiplication operation between a first operand and a second operand.

5. A method according to claim 4, comprising using a non-recoded radix-higher-than-four multiplication method for arbitrary signed two's complement integers for performing the multiplication operation between said first operand and said second operand according to one of the following Equations:

$$\tilde{y} = \sum_{r=0}^{n_{radix-T}-1} (A_r x) 2^{rt} = \sum_{r=0}^{\frac{n-1}{t}-1} \left(\left[\sum_{i=0}^{t-1} a_{tr+i} 2^i\right] x\right) 2^{tr} - (a_{n-1} x) 2^{n-1}, \text{ or}$$

$$\tilde{y} = \sum_{r=0}^{n/t-2} \left(\left[\sum_{i=0}^{t-1} a_{tr+i} 2^i\right] x\right) 2^{tr} + \left(\left[-2^{t-1} a_{n-1} + \sum_{i=0}^{t-2} a_{n-t+i} 2^i\right] x\right) 2^{n-t}$$

where $T=2^t$.

6. A method according to claim 4, comprising:
performing the multiplication operation in at least three pipeline stages, wherein the method further comprises:
inputting the first operand to the first pipeline stage, using said first and second suboperations in the first pipeline stage for forming a set of partial products of the first operand;
inputting the second operand to the second pipeline stage;
selecting in the second pipeline stage at least one partial product from the set of partial products formed in said first pipeline stage; and
combining the selected partial products in the third pipeline stage to form summation and carry terms of the multiplication operation between said first and second operands.

7. A method according to claim 6, comprising:
performing an addition operation in a fourth pipeline stage in which said summation and carry terms are combined to form the result of the multiplication operation.

8. A method according to claim 7, comprising:
processing several data portions at once;
performing the multiplication operation in one or more operating steps;
defining the operating step duration; and
defining the delays of the pipeline stages; and
defining a level of interlacing on the basis of said operating step duration and said delays of the pipeline stages for each of said pipeline stages.

9. A method according to claim 8, comprising:
defining the predetermined operating step duration to be $T_{des}$ seconds;
selecting the number of said data portions within each pipeline stage as follows:
the number of data portions of the first pipeline stage $p = \lceil D_{AA}/T_{des} \rceil$,
the number of data portions of the second pipeline stage $q = \lceil D_{SB}/T_{des} \rceil$,
the number of data portions of the third pipeline stage $u = \lceil D_{CA}/T_{des} \rceil$, and
the number of data portions of the fourth pipeline stage $v = \lceil D_{CLA}/T_{des} \rceil$,
in which $D_{AA}$ is the delay of the first pipeline stage, $D_{SB}$ is the delay of the second pipeline stage, $D_{CA}$ is the delay of the third pipeline stage, and $D_{CLA}$ is the delay of the fourth pipeline stage.

10. A method according to claim 8, comprising defining the level of interlacing to set the delays of each pipeline stage as equal as possible, and less than said predetermined operating step duration.

11. A method according to claim 10, comprising adjusting the delays of the pipeline stages by setting the number of said data portions to be processed at once within each pipeline stage to correspond to the predetermined operation step duration.

12. A method according to claim 1, comprising processing video information by the multiplication operation.

13. Device for performing a multiplication operation comprising:
at least a first pipeline stage and a second pipeline stage; said first pipeline stage being configured to perform a first calculation operation of said multiplication operation; and said second pipeline stage being configured to perform a second calculation operation of said multiplication operation;
said first pipeline stage comprising a plurality of data processing blocks configured to operate in a time-interlaced manner to perform at least a first and a second suboperation of the first calculation operation; and
the device further comprising means for starting the second suboperation before the first suboperation is finished.

14. A device according to claim 13, including at least one multiplexer for selectable data routing between pipeline stages.

15. A device according to claim 13, including at least two pipeline stages for performing each of said calculation operations in a pipelined manner, wherein at least two calculation operations are arranged to be performed in different pipeline stages.

16. A device according to claims 13, wherein said multiplication operation is arranged to be performed between a first operand and a second operand, and that the device comprises:
at least a first, a second and a third pipeline stage for performing said multiplication operations in a pipelined manner,
a first input for inputting the first operand to the first pipeline stage,
a second input for inputting the second operand to the second pipeline stage,
the data processing blocks of the first pipeline stage being configured to form a set of partial products of the first operand,
the second pipeline stage including a selector for selecting at least one partial product from the set of partial products formed in said first pipeline stage on a basis of the second operand, and
the third pipeline stage including a combiner to combine the selected partial products to form summation and terms of the multiplication operation between said first and second operands.

17. A device according to claim 16, further comprising a fourth pipeline stage, which comprises an adder to perform an addition operation between said summation and carry terms to form the result of the multiplication operation.

18. A device according to claim 17, wherein at least one pipeline stage is configured to process several data portions of the data at once, wherein said at least one pipeline stage comprises a data processing block for each data portion to process each data portion of the pipeline stage simultaneously.

19. A device according to claim 18, wherein the number of data processing blocks in each pipeline stage is such that the processing time of the data to be processed within a pipeline stage is the same in each pipeline stage.

20. A device according to claim 18, wherein the processing time is $T_{des}$ seconds, wherein the number of said data processing blocks within each pipeline stage is as follows:
the number of data portions of the first pipeline stage $p = \lceil D_{AA}/T_{des} \rceil$, the number of data portions of the second pipeline stage $q=\lceil D_{SB}/T_{des}\rceil$, the number of data portions of the third pipeline stage $u=\lceil D_{CA}/T_{des}\rceil$, and the number of data portions of the fourth pipeline stage $v=\lceil D_{CLA}/T_{des}\rceil$, in which $D_{AA}$ is the processing time of the data processing blocks of the first pipeline stage, $D_{SB}$ is the processing time of the data processing blocks of the second pipeline stage, $D_{CA}$ is the processing time of the data processing blocks of the third pipeline stage, and $D_{CLA}$ is the processing time of the data processing blocks of the fourth pipeline stage.

21. Video processing device for performing one multiplication operation and another multiplication operation in a pipelined manner, the video processing device comprising:

at least a first pipeline stage and a second pipeline stage, said first pipeline stage being configured to perform a first calculation operation of said multiplication operations, and said second pipeline stage being configured to perform a second calculation operation of said multiplication operation;

said first pipeline stage comprising a plurality of data processing blocks configured to operate in a time-interlaced manner to perform at least a first and a second suboperation of the first calculation operation;

the video processing device is configured to start the second suboperation before the first suboperation is finished.

22. A video processing device according to claims 21, wherein the video processing device is configured to perform said multiplication operation between a first operand and a second operand, and that the video processing device comprises:

at least a first, a second and a third pipeline stage for performing said multiplication operations in a pipelined manner, a first input for inputting the first operand to the first pipeline stage, a second input for inputting the second operand to the second pipeline stage, the data processing blocks of the first pipeline stage being configured to form a set of partial products of the first operand, the second pipeline stage including a selector for selecting at least one partial product from the set of partial products formed in said first pipeline stage on a basis of the second operand, and the third pipeline stage including a combiner to combine the selected partial products to form summation and terms of the multiplication operation between said first and second operands.

23. Integrated circuit for performing one multiplication operation and another multiplication operation in a pipelined manner, the integrated circuit including comprising:

at least a first pipeline stage and a second pipeline stage, said first pipeline stage being configured to perform a first calculation operation of said multiplication operation, and said second pipeline stage being configured to perform a second calculation operation of said multiplication operation;

said first pipeline stage comprising a plurality of data processing blocks configured to operate in a time-interlaced manner to perform at least a first and a second suboperation of the first calculation operation;

the integrated circuit is configured to start the second suboperation before the first suboperation is finished.

24. Wireless terminal comprising means for performing one multiplication operation and another multiplication operation in a pipelined manner comprising:

at least a first pipeline stage and a second pipeline stage, said first pipeline stage being configured to perform a first calculation operation of said the multiplication operation, and said second pipeline stage being configured to perform a second calculation operation of said multiplication operation;

said first pipeline stage comprising a plurality of data processing blocks configured to operate in a time-interlaced manner to perform at least a first and a second suboperation of the first calculation operation;

the wireless terminal is configured to start the second suboperation before the first suboperation is finished.

25. Computing device comprising means for performing one multiplication operation and another multiplication operation in a pipelined manner comprising:

at least a first pipeline stage and a second pipeline stage, said first pipeline stage being configured to perform a first calculation operation of said the multiplication operation, and said second pipeline stage being configured to perform a second calculation operation of said multiplication operation;

said first pipeline stage comprising a plurality of data processing blocks configured to operate in a time-interlaced manner to perform at least a first and a second suboperation of the first calculation operation;

the computing device is configured to start the second suboperation before the first suboperation is finished.

26. System for performing one multiplication operation and another multiplication operation in a pipelined manner, the system comprising:

at least a first pipeline stage and a second pipeline stage, said first pipeline stage being configured to perform a first calculation operation of said the multiplication operation, and said second pipeline stage being configured to perform a second calculation operation of said multiplication operation;

said first pipeline stage comprising a plurality of data processing blocks configured to operate in a time-interlaced manner to perform at least a first and a second suboperation of the first calculation operation;

the system is configured to start the second suboperation before the first suboperation is finished.

* * * * *

UNITED STATES PATENT AND TRADEMARK OFFICE
CERTIFICATE OF CORRECTION

PATENT NO. : 7,334,011 B2
APPLICATION NO. : 10/703154
DATED : February 19, 2008
INVENTOR(S) : Guevorkian et al.

It is certified that error appears in the above-identified patent and that said Letters Patent is hereby corrected as shown below:

1. On the Title page at (items 75 and 12) "Guevokian" should be --Guevorkian--.
2. In column 23, line 37, "and" should be deleted.
3. In column 23, line 48, "p-" should be --p=--.
4. In column 24, line 67, "p-" should be --p=--.

Signed and Sealed this

Twenty-fourth Day of February, 2009

JOHN DOLL
*Acting Director of the United States Patent and Trademark Office*